United States Patent
Li et al.

(10) Patent No.: US 9,622,251 B2
(45) Date of Patent: Apr. 11, 2017

(54) METHOD OF INTERFERENCE COORDINATION IN TIME DIVISION DUPLEXING SYSTEM, BASE STATION, AND SYSTEM

(71) Applicant: Huawei Technologies Co., Ltd., Shenzhen, Guangdong (CN)

(72) Inventors: Yang Li, Guangdong (CN); Sha Ma, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 14/573,862

(22) Filed: Dec. 17, 2014

(65) Prior Publication Data

US 2015/0103706 A1    Apr. 16, 2015

Related U.S. Application Data

(63) Continuation of application No. PCT/CN2012/077803, filed on Jun. 28, 2012.

(51) Int. Cl.
*H04L 1/00* (2006.01)
*H04W 72/08* (2009.01)
(Continued)

(52) U.S. Cl.
CPC ......... *H04W 72/082* (2013.01); *H04W 16/10* (2013.01); *H04L 5/14* (2013.01)

(58) Field of Classification Search
CPC ....... H04W 4/02; H04W 76/02; H04W 88/02; H04W 88/06; H04W 92/02; H04W 16/32;
(Continued)

(56) References Cited

U.S. PATENT DOCUMENTS

2010/0220597 A1    9/2010 Ji et al.
2011/0149813 A1    6/2011 Parkvall et al.
(Continued)

FOREIGN PATENT DOCUMENTS

CN    101646257 A    2/2010
CN    101795473 A    8/2010
(Continued)

OTHER PUBLICATIONS

"Details of eICIC in Macro-Pico case," 3GPP TSG RAN WG1 Meeting #62 bis, Xian, China, R1-105352, 3$^{rd}$ Generation Partnership Project, Valbonne, France (Oct. 11-15, 2010).

*Primary Examiner* — Dady Chery
(74) *Attorney, Agent, or Firm* — Leydig, Voit & Mayer, Ltd.

(57) ABSTRACT

An interference coordination method in TDD systems, an apparatus, and a system are disclosed in embodiments of this invention, which relate to the communication field. The method provided in the embodiment of this invention comprises: receiving by an interfered cell a uplink-downlink configuration of an interfering cell sent from the interfering cell; generating by the interfered cell interference indication information for subframes in the interfered cell in a direction opposite to the signal transmission direction in the interfering cell, according to a uplink-downlink configuration of the interfered cell and the uplink-downlink configuration of the interfering cell; sending by the interfered cell the uplink-downlink configuration of the interfered cell and the interference indication information to the interfering cell, to enable the interfering cell to perform interference coordination according to the uplink-downlink configuration of the interfered cell and the interference indication information.

18 Claims, 7 Drawing Sheets

(51) Int. Cl.
*H04W 16/10* (2009.01)
*H04L 5/14* (2006.01)

(58) Field of Classification Search
CPC ..... H04W 16/18; H04W 36/30; H04W 16/24; H04W 24/00; H04W 24/02; H04W 16/10; H04W 28/04; H04W 72/04; H04W 72/082
USPC ........... 455/452.1, 422.1, 446; 370/230, 231, 370/280, 328, 329, 341
See application file for complete search history.

(56) References Cited

U.S. PATENT DOCUMENTS

| | | |
|---|---|---|
| 2011/0176461 A1 | 7/2011 | Astely et al. |
| 2011/0292846 A1 | 12/2011 | Hu et al. |
| 2012/0122440 A1* | 5/2012 | Krishnamurthy ..... H04L 5/0053 455/418 |
| 2014/0126501 A1 | 5/2014 | Pan et al. |

FOREIGN PATENT DOCUMENTS

| | | |
|---|---|---|
| CN | 101932100 A | 12/2010 |
| CN | 102026209 A | 4/2011 |
| CN | 102149099 A | 8/2011 |
| CN | 102158910 A | 8/2011 |
| CN | 102457972 A | 5/2012 |
| EP | 2627141 A2 | 8/2013 |
| WO | WO 02075963 A2 | 9/2002 |
| WO | WO 2012062226 A2 | 5/2012 |

* cited by examiner interfered cell

| 0# D | 1# | 2# S | 3# S | 4# D | interfering cell

| 0# D | 1# | 2# S | 3# D | 4# D |

Fig.4

Cell 1

| 0# D | 1# | 2# S | 3# S | 4# D |

Cell 2

| 0# D | 1# | 2# S | 3# D | 4# D |

Cell 3

| 0# D | 1# | 2# S | 3# S | 4# S |

Fig.5

METHOD OF INTERFERENCE COORDINATION IN TIME DIVISION DUPLEXING SYSTEM, BASE STATION, AND SYSTEM

CROSS-REFERENCE TO RELATED APPLICATIONS

This application is a continuation of International Patent Application No. PCT/CN2012/077803, filed on Jun. 28, 2012, which is hereby incorporated by reference in its entirety.

TECHNICAL FIELD

This invention relates to the communication field, and more particularly, to an interference coordination method in time division duplexing systems, a device and a system.

BACKGROUND

In time division duplexing (TDD) mobile communication systems, uplink and downlink transmissions are performed on different time slots of the same frequency spectrum resource respectively. As compared to frequency division duplexing (FDD) systems, TDD systems do not require paired frequencies, having low frequency spectrum and device costs, more flexible uplink and downlink resource configuration, and thus suitable to asymmetric uplink and downlink data transmission data rates, especially to Internet Protocol (IP) data services.

With the development of mobile communication techniques, the requirement for mobile data service traffic is rapidly increasing at a speed doubled every year, and more than 80 percent of data services comes from indoor and hot spot areas. In order to reduce workloads for macrocell networks and make the growth of revenue match with the increase in provided data service traffic, operators need to deploy more cells in indoor and hot spot areas to provide high-speed data services.

The characteristics of TDD make it very suitable for small cells, allowing adaptive changes in uplink and downlink subframe configuration according to the requirement for uplink and downlink traffic smartly, so as to provide higher user data rate experience and higher system usage efficiency. However, in order to cover hot spots, it may be necessary to deploy multiple small cells in an area, and various kinds of interference may occur between adjacent small cells, for example, uplink-downlink interference, uplink-uplink interference, and downlink-downlink interference. Interference coordination is necessary in order to reduce effects caused by the interference. Wherein, uplink-downlink interference is caused by different uplink-downlink subframe configurations employed by adjacent small cells, and the downlink (or the uplink) of a cell may be interfered by the uplink (or the downlink) of an adjacent cell.

However, only uplink-uplink interference and downlink-downlink interference can be handled in the prior art, and it is unable to distinguish uplink-downlink interference and perform interference coordination on uplink-downlink interference.

SUMMARY

An interference coordination method in TDD systems, a base station (BS) and a system are provided in embodiments of this invention, in which an interfered cell may identify uplink-downlink interference according to the uplink-downlink configuration of an interfering cell, and then send uplink-downlink interference indication information to the interfering cell to perform interference coordination on uplink-downlink interference in the interfering cell.

In order to achieve the above object, the technical solution employed in the embodiment of this invention is as follows.

On one aspect, an interference coordination method in TDD systems is provided in an embodiment of this invention, comprising:

receiving by an interfered cell a uplink-downlink configuration of an interfering cell sent from the interfering cell;

generating by the interfered cell interference indication information for subframes in the interfered cell in a direction opposite to the signal transmission direction in the interfering cell, according to a uplink-downlink configuration of the interfered cell and the uplink-downlink configuration of the interfering cell;

sending by the interfered cell the uplink-downlink configuration of the interfered cell and the interference indication information to the interfering cell, to enable the interfering cell to perform interference coordination according to the uplink-downlink configuration of the interfered cell and the interference indication information.

Another interference coordination method in TDD systems is provided in an embodiment of this invention, comprising:

sending by an interfering cell a uplink-downlink configuration of the interfering cell to an interfered cell;

receiving by the interfering cell the uplink-downlink configuration of the interfered cell sent from the interfered cell, and interference indication information for subframes in the interfered cell in a direction opposite to the signal transmission direction in the interfering cell that is generated by the interfered cell according to the uplink-downlink configuration of the interfered cell and the uplink-downlink configuration of the interfering cell;

performing by the interfering cell interference coordination according to the uplink-downlink configuration of the interfered cell and the interference indication information.

On one aspect, a BS is provided in an embodiment of this invention, which is used in an interfered cell, comprising:

a receiving unit, for receiving a uplink-downlink configuration of an interfering cell sent from the interfering cell;

a generation unit, for generating interference indication information for subframes in the interfered cell in a direction opposite to the signal transmission direction in the interfering cell, according to a uplink-downlink configuration of the interfered cell and the uplink-downlink configuration of the interfering cell;

a sending unit, for sending the uplink-downlink configuration of the interfered cell and the interference indication information to the interfering cell, to enable the interfering cell to perform interference coordination according to the uplink-downlink configuration of the interfered cell and the interference indication information.

Another BS is provided in an embodiment of this invention, which is used in an interfered cell, comprising:

a receiver, for receiving a uplink-downlink configuration of an interfering cell sent from the interfering cell;

a processor, for generating interference indication information for subframes in the interfered cell in a direction opposite to the signal transmission direction in the interfering cell, according to a uplink-downlink configuration of the interfered cell and the uplink-downlink configuration of the interfering cell received by the receiver;

a sender, for sending the uplink-downlink configuration of the interfered cell and the interference indication information generated by the processor to the interfering cell, to enable the interfering cell to perform interference coordination according to the uplink-downlink configuration of the interfered cell and the interference indication information.

Another BS is provided in an embodiment of this invention, which is used in an interfering cell, comprising:

a sending unit, for sending a uplink-downlink configuration of the interfering cell to an interfered cell;

a receiving unit, for receiving the uplink-downlink configuration of the interfered cell sent from the interfered cell, and interference indication information for subframes in the interfered cell in a direction opposite to the signal transmission direction in the interfering cell that is generated by the interfered cell according to the uplink-downlink configuration of the interfered cell and a uplink-downlink configuration of the interfering cell;

a processing unit, for performing interference coordination according to the uplink-downlink configuration of the interfered cell and the interference indication information received by the receiving unit.

Another BS is provided in an embodiment of this invention, which is used in an interfering cell, comprising:

a sender, for sending a uplink-downlink configuration of the interfering cell to an interfered cell;

a receiver, for receiving the uplink-downlink configuration of the interfered cell sent from the interfered cell, and interference indication information for subframes in the interfered cell in a direction opposite to the signal transmission direction in the interfering cell that is generated by the interfered cell according to the uplink-downlink configuration of the interfered cell and a uplink-downlink configuration of the interfering cell;

a processor, for performing interference coordination according to the uplink-downlink configuration of the interfered cell and the interference indication information received by the receiving unit.

On still another aspect of this invention, a TDD system is provided in an embodiment of this invention, comprising: a first BS used in an interfered cell and a second BS used in an interfering cell, wherein, the first BS is used to receive a uplink-downlink configuration of an interfering cell sent from the interfering cell; generate interference indication information for subframes in the interfered cell in a direction opposite to the signal transmission direction in the interfering cell, according to a uplink-downlink configuration of the interfered cell and the uplink-downlink configuration of the interfering cell received by the receiver; send the uplink-downlink configuration of the interfered cell and the interference indication information generated by the processor to the interfering cell.

the second BS is used to send a uplink-downlink configuration of the interfering cell to an interfered cell; receive the uplink-downlink configuration of the interfered cell sent from the interfered cell, and interference indication information for subframes in the interfered cell in a direction opposite to the signal transmission direction in the interfering cell that is generated by the interfered cell according to the uplink-downlink configuration of the interfered cell and a uplink-downlink configuration of the interfering cell; perform interference coordination according to the uplink-downlink configuration of the interfered cell and the interference indication information.

According to the interference coordination method in TDD systems, the BS, and the system provided in the embodiments of this invention, the interfered cell may distinguish uplink-downlink interference based on the uplink-downlink configuration of the interfering cell, and send the uplink-downlink interference indication information to the interfering cell, so that interference coordination can be performed on uplink-downlink interference by the interfering cell. The problem in the prior art of merely capable of handling uplink-uplink interference and down-link-downlink interference, unable to distinguish uplink-downlink interference and perform interference coordination on uplink-downlink interference can be solved.

BRIEF DESCRIPTION OF THE SEVERAL VIEWS OF THE DRAWINGS

For a more explicit description of the technical solutions of embodiments of this invention, a brief introduction of accompanying drawings to be used in the description of these embodiments will be given below. Obviously, accompanying drawings described below are merely some embodiments of this invention, for those skilled in the art, other accompanying drawings can be derived from these ones without any creative efforts.

FIG. 4 is a uplink-downlink configuration diagram of an interfering cell and an interfered cell provided in an embodiment of this invention;

FIG. 5 is a uplink-downlink configuration diagram of three cells provided in an embodiment of this invention;

DETAILED DESCRIPTION

A clear and complete description of technical solutions of embodiments of this invention will be given with reference to the accompanying drawings of the embodiments of this invention. Obviously, embodiments described herein are merely some embodiments of this invention, but not all of them. Based on those embodiments of this invention, other embodiments can occur to those skilled in the art without any creative efforts, all of which fall within the scope of this invention.

A description of the embodiment of this invention will be given in terms of the interfering cell side and the interfered cell side respectively, as well as a corporation embodiment thereof, which however does not imply that they must be implemented in a combination manner. In fact, when the interfering cell and the interfered cell are implemented separately, the problems respectively existing on the interfering cell side and the interfered cell side can be solved, and better technical effects may be nonetheless obtained when the both are employed in a combination manner. The interfering cell and the interfered cell in the embodiments of this invention are relative to each other, and according to particular interference situations, each cell may be either an interfering cell or an interfered cell.

Figure 1:
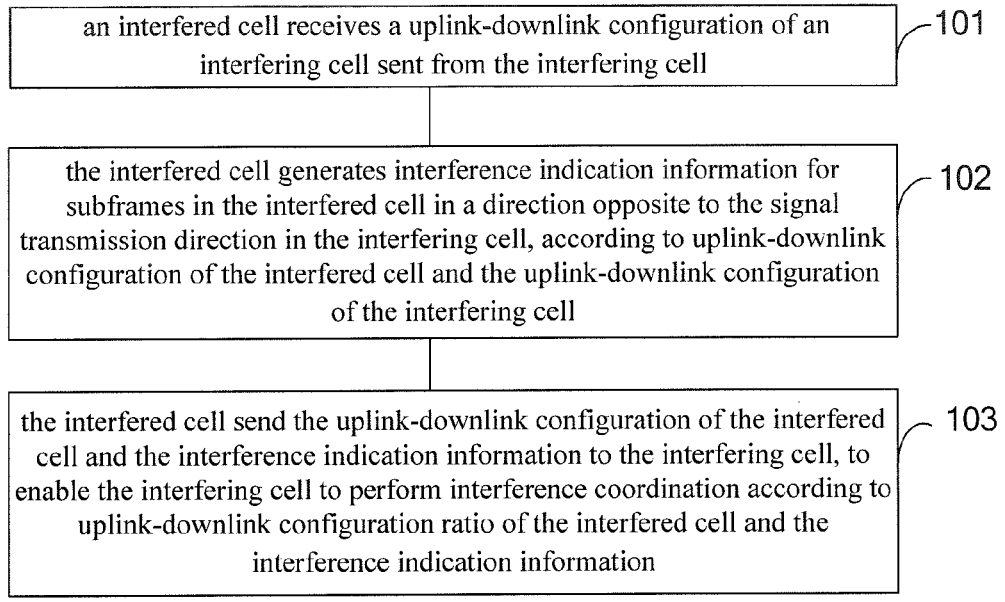
FIG. 1 is a flowchart of an interference coordination method in TDD systems provided in an embodiment of this invention.

Referring to FIG. 1, which is a flow chart of an interference coordination method on the interfered cell side, as shown in the figure, comprising the following steps:

101: an interfered cell receives a uplink-downlink configuration of an interfering cell sent from the interfering cell;

102: according to a uplink-downlink configuration of the interfered cell and the uplink-downlink configuration of the interfering cell, the interfered cell generates interference indication information for subframes in the interfered cell in a direction opposite to the signal transmission direction in the interfering cell;

As an illustration, generating interference indication information for subframes in the interfered cell in a direction opposite to the signal transmission direction in the interfering cell by the interfered cell according to a uplink-downlink configuration of the interfered cell and the uplink-downlink configuration of the interfering cell may comprise:

according to the uplink-downlink configuration of the interfered cell and the uplink-downlink configuration of the interfering cell, obtaining interference indication information for subframes in the interfered cell in a direction opposite to the signal transmission direction in the interfering cell by the interfered cell, comprising:

according to the uplink-downlink configuration of the interfered cell and the uplink-downlink configuration of the interfering cell, matching the signal transmission directions of corresponding subframes in the interfered cell and the interfering cell by the interfered cell;

determining, by the interfered cell, subframes in the interfered cell in a direction opposite to the signal transmission direction in the interfering cell;

As an illustration, the subframe in the interfered cell in a direction opposite to the signal transmission direction in the interfering cell comprise at least one of the following subframes:

a subframe corresponding to that a signal in the interfered cell is downlink and a signal in the interfering cell is uplink;

a subframe corresponding to that a signal in the interfered cell is uplink and a signal in the interfering cell is downlink.

The interfered cell generates interference indication information for subframes in the interfered cell in a direction opposite to the signal transmission direction in the interfering cell according to an interference measurement value.

As an illustration, the interference indication information may comprise: information indicating the interference strength level at each resource granularity, or information indicating the interference impact on the interfered cell of the interfering cell at each resource granularity.

103: the interfered cell sends the uplink-downlink configuration of the interfered cell and the interference indication information to the interfering cell to allow the interfering cell to perform interference coordination according to the uplink-downlink configuration of the interfered cell and the interference indication information.

According to the interference coordination method in TDD systems provided in the embodiment of this invention, the interfered cell may distinguish uplink-downlink interference according to the uplink-downlink configuration of the interfering cell, and send the uplink-downlink interference indication information to the interfering cell to perform interference coordination on uplink-downlink interference by the interfering cell. Therefore, the problem in the prior art of merely capable of handling uplink-uplink interference and downlink-downlink interference, unable to distinguish uplink-downlink interference and perform interference coordination on uplink-downlink interference can be solved.

Figure 2:
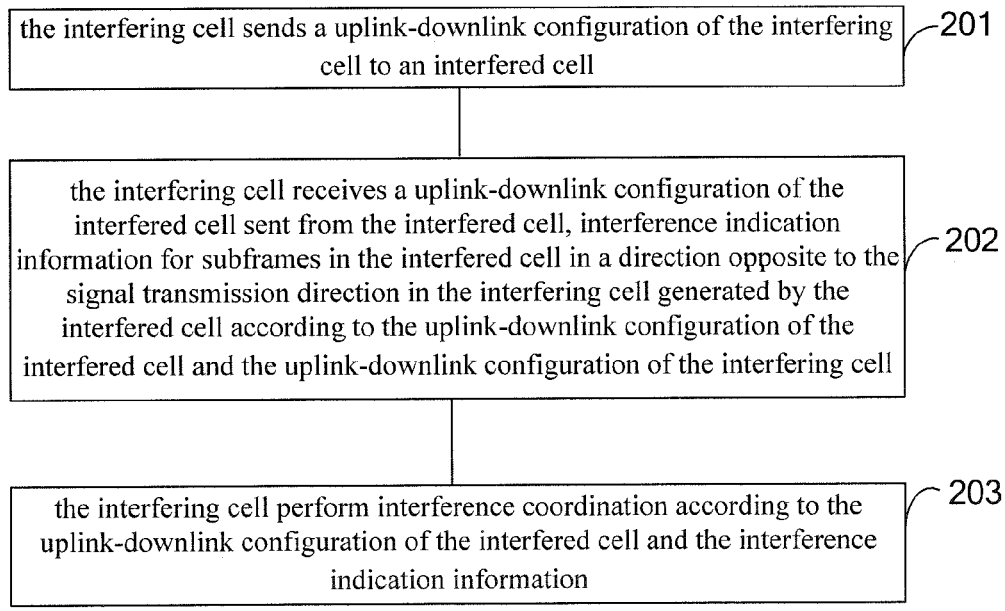
FIG. 2 is a flowchart of another interference coordination method in TDD systems provided in an embodiment of this invention.

Referring to FIG. 2, which is a flowchart of an interference coordination method on the interfering cell side, as shown in the figure, comprising the following steps:

201: the interfering cell sends a uplink-downlink configuration of the interfering cell to an interfered cell;

202: the interfering cell receives a uplink-downlink configuration of the interfered cell sent from the interfered cell and interference indication information for subframes in the interfered cell in a direction opposite to the signal transmission direction in the interfering cell generated by the interfered cell according to the uplink-downlink configuration of the interfered cell and the uplink-downlink configuration of the interfering cell;

As an illustration, the subframes in the interfered cell in a direction opposite to the signal transmission direction in the interfering cell comprise at least one of the following subframes:

a subframe corresponding to that a signal in the interfered cell is downlink and a signal in the interfering cell is uplink;

a subframe corresponding to that a signal in the interfered cell is uplink and a signal in the interfering cell is downlink.

As an illustration, the interference indication information may comprise: information indicating the interference strength level at each resource granularity, or information indicating the interference impact on the interfered cell of the interfering cell at each resource granularity.

203: the interfering cell performs interference coordination according to the uplink-downlink configuration of the interfered cell and the interference indication information.

As an illustration, performing interference coordination by the interfering cell according to the uplink-downlink configuration of the interfered cell and the interference indication information may comprise:

determining subframes of the interfering cell causing uplink-downlink interference on the interfered cell by the interfering cell according to the uplink-downlink configuration of the interfered cell and the uplink-downlink configuration of the interfering cell;

according to the interference indication information, adjusting the transmitted power of the subframes causing uplink-downlink interference on the interfered cell by the interfering cell, or adjusting resource locations used by UEs served by the interfering cell, so as to reduce or avoid interference caused on the interfered cell.

According to the interference coordination method in TDD systems provided in the embodiment of this invention, the interfering cell may send the uplink-downlink configuration to the interfered cell to allow the interfered cell to distinguish uplink-downlink interference according to the uplink-downlink configuration of the interfering cell, and generate uplink-downlink interference indication information, by which the interfering cell may realize interference coordination for uplink-downlink interference. Therefore, the problem in the prior art that only uplink-uplink interference and downlink-downlink interference can be handled, with indistinguishable uplink-downlink interference, and unavailable interference coordination for uplink-downlink interference can be solved.

Figure 3:
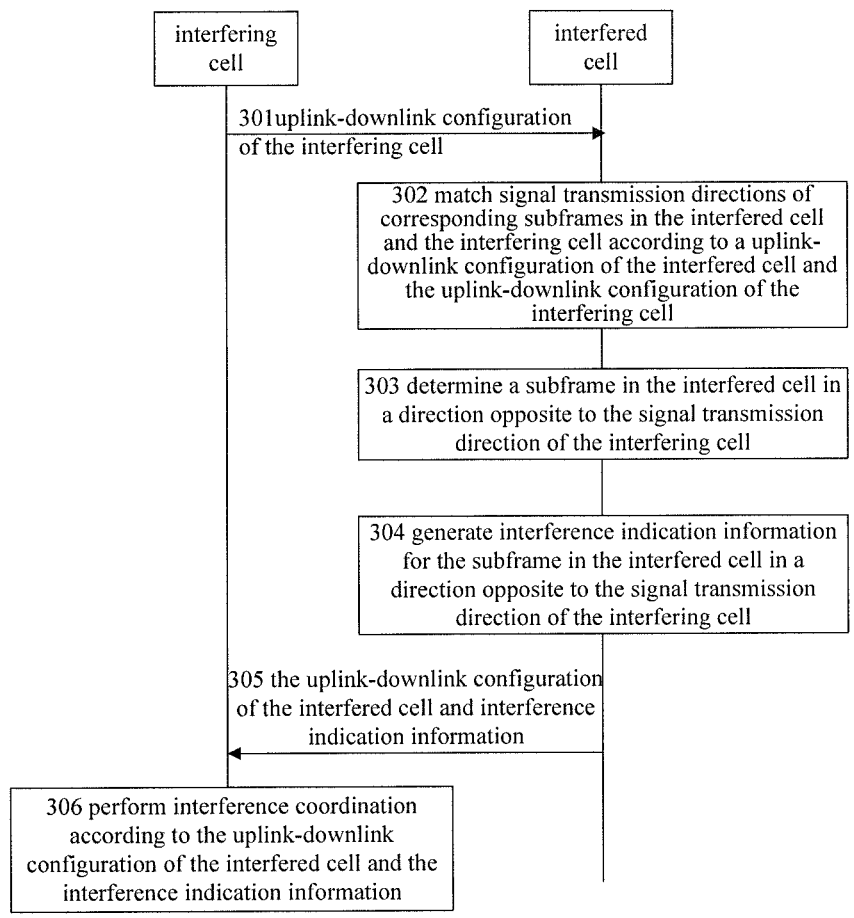
FIG. 3 is a flowchart of another interference coordination method in TDD systems provided in an embodiment of this invention.
Figure 6:
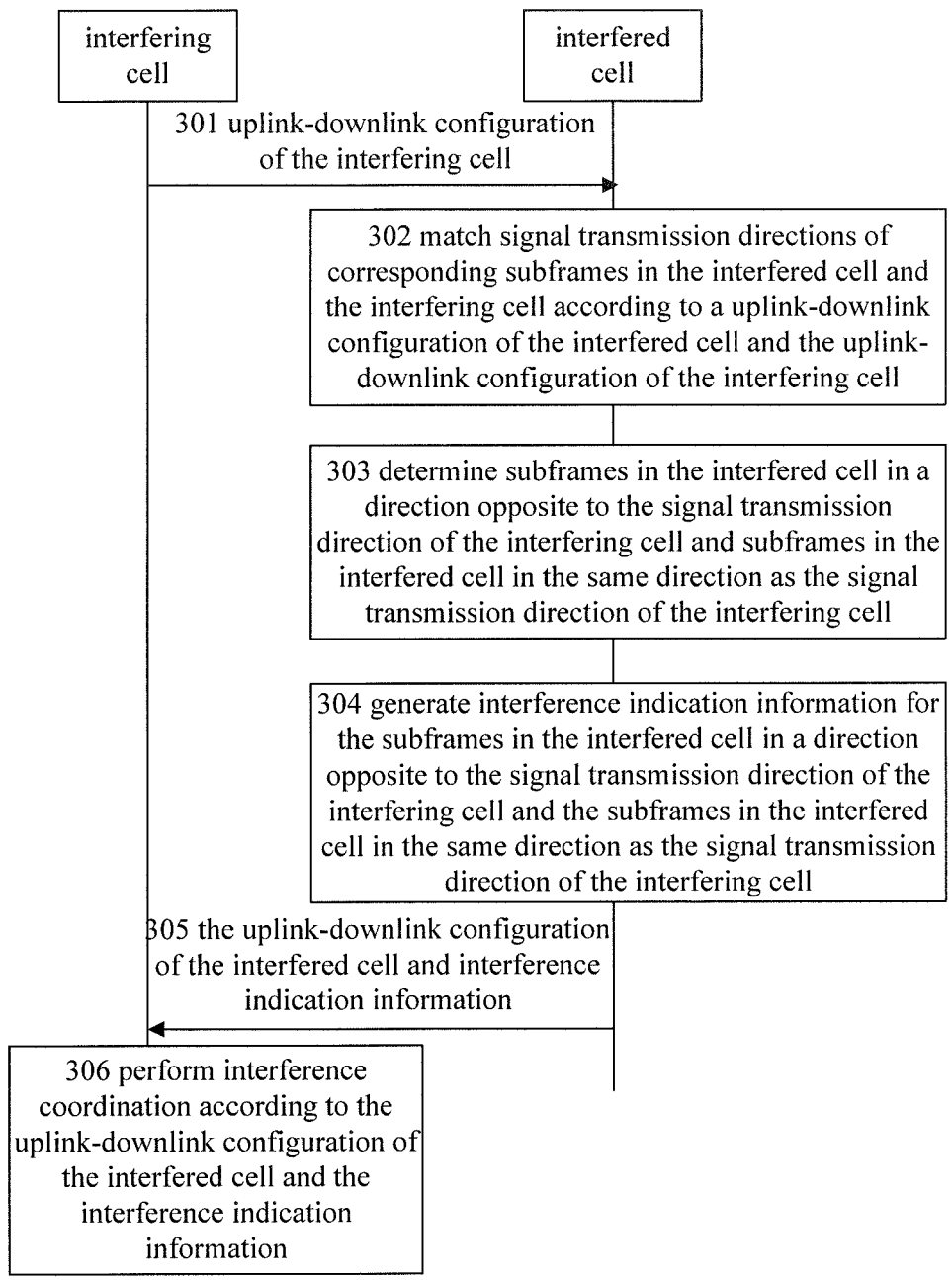
FIG. 6 is a structural diagram of a BS used in an interfered cell provided in an embodiment of this invention.

Below, the above method embodiment will be illustrated with a particular embodiment. Referring to FIG. 3, it comprises the following steps.

301: an interfering cell sends a uplink-downlink configuration of the interfering cell to an interfered cell;

In a TDD system, uplink and downlink signal transmissions occur in different time slots on the same frequency channel, in single-carrier system, depending on different service traffic conditions, the uplink and downlink uplink-downlink configuration used in the system may be switched semi-dynamically. For example, the LTE TDD system defines seven uplink and downlink uplink-downlink configurations (also referred to as uplink-downlink configuration hereinafter for the convenience of description), as shown in table 1. Wherein, 'D' represents downlink subframes, 'U' represents uplink subframes, 'S' represents special subframes (including downlink transmission slots, guard time, and uplink transmission slots), and a cell may configure different uplink-downlink configurations to match its practical uplink and downlink data service requirements.

TABLE 1 uplink and downlink uplink-downlink configuration

| Config-uration No. | perio-dicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to FIG. 4, assume that uplink-downlink configurations used in the interfered cell and the interfering cell are uplink-downlink configuration 1 and uplink-downlink configuration 2, respectively.

As an illustration, the interfering cell may send the uplink-downlink configuration of the interfering cell to the interfered cell in the following way:

a BS of the interfering cell sends the uplink-downlink configuration of the interfering cell to a BS of the interfered cell through a X2 interface; or the BS of the interfering cell sends the uplink-downlink configuration of the interfering cell to a BS of the interfered cell through an air interface on a dedicated channel or a pilot signal; or the BS of the interfering cell sends a system message to a UE of the interfered cell to make the UE served by the interfered cell be aware of the uplink-downlink configuration of the interfering cell and then transmit the uplink-downlink configuration of the interfering cell to a BS of the interfered cell; or a BS of the interfering cell forwards the uplink-downlink configuration of the interfering cell to a BS of the interfered cell through an upper network.

302: the interfered cell matches signal transmission directions of corresponding subframes in the interfered cell and the interfering cell according to a uplink-downlink configuration of the interfered cell and the uplink-downlink configuration of the interfering cell;

As an illustration, the interfered cell matches signal transmission directions of corresponding subframes in the interfered cell and the interfering cell to determine whether the signal transmission directions of the corresponding subframes in the interfered cell and the interfering cell are consistent.

For example, referring to FIG. 4, as to subframe #0, the signal transmission direction of the interfered cell is downlink, and the signal transmission direction of the interfering cell is downlink, and thus the interfered cell and the interfering cell have the same signal transmission direction at subframe #0; similarly, when the signal transmission direction of the interfered cell is uplink, and the signal transmission direction of the interfering cell is also uplink, and thus the interfered cell and the interfering cell also have the same signal transmission direction, interference on the interfered cell generated by the interfering cell is interference in the same direction, such as, interference generated by a downlink signal transmitted by the interfering cell on a downlink signal transmitted by the interfered cell which is generated by a downlink signal transmitted by the interfering cell; or interference on an uplink signal transmitted by a UE served by the interfered cell which is generated by an uplink signal transmitted by a UE served by the interfering cell.

Again, as to subframe #3, the signal transmission direction of the interfered cell is uplink, and the signal transmission direction of the interfering cell is downlink, and thus the interfered cell and the interfering cell have opposite signal transmission directions at subframe #3; similarly, when the signal transmission direction of the interfered cell is downlink, and the signal transmission direction of the interfering cell is uplink, the interfered cell and the interfering cell also have opposite signal transmission directions, and interference on the interfered cell generated by the interfering cell is uplink-downlink interference, for example, interference on an uplink signal transmitted by a UE served by the interfered cell which is generated by a downlink signal transmitted by the interfering cell; or interference on a downlink signal transmitted by the interfered cell which is generated by a downlink signal transmitted by a UE served by the interfering cell.

303: the interfered cell determines a subframe in the interfered cell having a signal transmission direction opposite to that of the interfering cell;

As an illustration, according to the above matching result, determining a subframe in the interfered cell having a signal transmission direction opposite to that of the interfering cell by the interfered cell may comprise:

a subframe corresponding to that a signal in the interfered cell is downlink and a signal in the interfering cell is uplink;

a subframe corresponding to that a signal in the interfered cell is uplink and a signal in the interfering cell is downlink.

For example, referring to FIG. 4, the interfered cell and interfering cell have out-of-step subframes at subframe#3.

304: the interfered cell generates interference indication information for the subframe in the interfered cell in a direction opposite to the signal transmission direction of the interfering cell;

As an illustration, generating by the interfered cell interference indication information for the subframe in the interfered cell in a direction opposite to the signal transmission direction of the interfering cell may comprise the following steps:

1. The interfered cell obtains an interference measurement value of the subframe in the interfered cell in a direction opposite to the signal transmission direction of the interfering cell;

As an illustration, as to a subframe for which a signal in the interfered cell is uplink and a signal in the interfering cell is a downlink, the uplink signal in the interfered cell is interfered by the downlink signal in the interfering cell (referred to as downlink-to-uplink interference for simplicity), the interference measurement is performed by a BS of the interfered cell, which obtains a downlink-uplink interference measurement value through measuring the received signal power of downlink data channel or a pilot signal transmitted by a BS of the interfering cell when it reaches the BS of the interfered cell;

As to a subframe for which a signal in the interfered cell is downlink and a signal in the interfering cell is uplink, the downlink signal in the interfered cell is interfered by the uplink signal in the interfering cell (referred to as uplink-to-downlink interference for simplicity), the interfered cell obtains an interference measurement value through a UE it serves; for example, comprising:

notifying by the BS of the interfered cell the UE served by the interfered cell of the position where the subframe having uplink-to-downlink interference locates through control signaling, or notifying the UE served by the interfered cell of the uplink-downlink configuration of the interfering cell, by the BS of the interfered cell through control signaling, to enable the UE to be aware of the subframe having uplink-downlink interference through the uplink-downlink configuration of the interfering cell and the uplink-downlink configuration of the interfered cell;

measuring by the UE served by the interfered cell the received signal power of uplink data channel or a pilot signal transmitted by the UE served by the interfering cell when it reaches the a UE served by the interfered cell at the subframe having uplink-downlink interference, thereby obtaining the uplink-to-downlink interference measurement value;

sending the interference measurement value by the UE served by the interfered cell to the BS of the interfered cell.

Preferably, when the interference measurement is performed by the BS or UE, interference strength may be measured in a specific measurement time window for all or some measurable subframes, after which the interference measurement values that have been measured are averaged to finally obtain an interference measurement value corresponding to the measurement time window. Then, the operation is repeated for a next measurement time window.

2. The interfered cell, according to the interference measurement value, generates the interference indication information for the subframe in the interfered cell in a direction opposite to the signal transmission direction of the interfering cell.

As an illustration, the interference indication information may comprise: information indicating the interference strength level at each resource granularity, or information indicating the interference impact on the interfered cell of the interfering cell at each resource granularity.

For example,

1. Information indicating the interference strength level may be predetermined in the interfering cell and the interfered cell, or systems where interfering cell and the interfered cell locate. For example, the predetermined information indicating interference strength levels may represent power levels by 4 bits and the power levels $\in\{-\infty, -11, -10, -9, -8, -7, -6, -5, -4, -3, -2, -1, 0, +1, +2, +3\}[dB]$, wherein each power level is represented, in the order from low to high, by information bits "0000", "0001", "0010", "0011", . . . , "1111". The BS of the interfered cell quantifies the obtained interference measurement value, and for which predetermined interference strength level the quantified result corresponds to, its corresponding bit representation is used as the interference indication information. If the interference measurement value is quantified to −7.8 dB, "0010" is used as the interference indication information.

2. Information indicating the interference impact on the interfered cell of the interfering cell may be predetermined in the interfering cell and the interfered cell or systems where the interfering cell and the interfered cell locate. For example, two bits "00", "01", "10" may be used to represent "weak", "middle", "strong" interference impacts on the interfered cell by the interfering cell. The BS of the interfered cell compares the obtained interference measurement value and the effective received signal power of the interfered cell to obtain a received Signal to Interference Ratio (SIR). An interference impact threshold may be defined in advance. The interfered cell may compare the obtained SIR and the threshold, for example, when the SIR exceeds the threshold, it indicates strong interference and the interference indication information is represented by "10"; when the SIR is below than the threshold, it indicates weak interference and the interference indication information is represented by "00"; when the SIR is close to the threshold, it indicates middle interference and the interference indication information is represented by "01".

As an illustration, the interference indication information may comprise interference indication information for each resource granularity, wherein a resource granularity may comprise a physical resource block (PRB) or several PRBs, and there is not limitation on the specific representation form of the interference indication information. For example, the interference indication information may be wide-band interference indication information, i.e., a piece of interference indication information generated for the whole system bandwidth, comprising interference indication information for each resource granularity in the whole system bandwidth; or the interference indication information may be narrow-band interference indication information, i.e., the entire system bandwidth is divided into multiple frequency bands, and a piece of interference indication information is generated for each frequency band, comprising interference indication information for each resource granularity in the frequency band. Due to frequency selectivity of interference, interference indication information for multiple narrow bands is benefit for interference coordination carried out on separate frequency bands; or the interference indication information may comprise both wide-band interference indication information and narrow-band interference indication information.

305: the interfered cell sends the uplink-downlink configuration of the interfered cell and the generated interference indication information to the interfering cell;

As an illustration, the interfered cell may send the uplink-downlink configuration of the interfered cell and the generated interference indication information to the interfering cell in the following way:

The BS of the interfered cell sends the uplink-downlink configuration of the interfered cell and the generated interference indication information to the BS of interfering cell through a X2 interface;

The BS of the interfered cell sends the uplink-downlink configuration of the interfered cell and the generated interference indication information to the BS of the interfering cell through an air interface on a dedicated channel or a pilot signal; or The BS of the interfered cell sends, through a backhaul link or S1 interface, the uplink-downlink configuration of the interfered cell and the generated interference indication information to an upper level network centralized controller, from which they are forwarded to the BS of the interfering cell.

306: the interfering cell performs interference coordination according to the uplink-downlink configuration of the interfered cell and the interference indication information.

As an illustration, performing interference coordination according to the uplink-downlink configuration of the interfered cell and the interference indication information by the interfering cell may comprise the following steps:

The interfering cell determines a subframe of the interfering cell causing uplink-downlink interference on the interfered cell according to the uplink-downlink configuration of the interfered cell and the uplink-downlink configuration of the interfering cell;

As an illustration, the particular method is the same as the matching process of the interfered cell, which will not be described repeatedly.

According to the interference indication information, the interfering cell adjusts the transmitted power for the subframe for which downlink interference is caused on the interfered cell, or adjusts resource locations used by UEs served by the interfering cell, so as to reduce or avoid interference caused on the interfered cell.

For example, when the interference indication information is information indicating the interference impact on the interfered cell of the interfering cell, and the interference indication information for a resource granularity or several resource granularities is "10", representing a "strong" interference impact on the interfered cell's signal produced by the interfering cell's signal at that resource granularity or several resource granularities, the interfering cell may reduce the transmitted power of the BS of the interfering cell (for downlink-to-uplink interference) or UE (for uplink-to-downlink interference) at a corresponding resource granularity position, or schedule the downlink channel or the uplink channel to another resource granularity that does not generate a strong interference impact for transmission.

Preferably, an update period may be further set. Correspondingly, according to the uplink-downlink configuration of the interfered cell, the uplink-downlink configuration of the interfering cell and the set update period, the interfered cell generates interference indication information in each update period for subframes in the interfered cell in a direction opposite to the signal transmission direction in the interfering cell; and according to the set update period, the uplink-downlink configuration of the interfered cell in each update period and interference indication information in each update period are sent to the interfering cell; according to the set update period, the interfering cell performs interference coordination in each update period according to the uplink-downlink configuration of the interfered cell and the interference indication information in each update period.

Furthermore, when there are two or more interfering cells, referring to FIG. 5, cell 2 is the interfered cell, cell 1 and cell 3 are interfering cells, the interference coordination processes of cell 1 and cell 3 are independent with each other, for example, cell 1 and cell 3 send their respective subframe allocation configurations to cell 2, which determines subframes in a direction opposite to the signal transmission direction of cell 1 according to the uplink-downlink configurations of cell 1 and cell 2, and then generates interference indication information for cell 1, sends the uplink-downlink configuration of cell 2 and the interference indication information for cell 1 generated by cell 2 to cell 1, and cell 1 performs interference process according to the uplink-downlink configuration of cell 2 and the interference indication information for cell 1 generated by cell 2; cell 2 further determines subframes in a direction opposite to the signal transmission direction of cell 3 according to the uplink-downlink configurations of cell 2 and cell 3, and then generates interference indication information for cell 3, sends the uplink-downlink configuration of cell 2 and the interference indication information for cell 3 generated by cell 2 to cell 3, and cell 3 performs interference process according to the uplink-downlink configuration of cell 2 and the interference indication information for cell 3 generated by cell 2.

According to the interference coordination method in TDD systems provided in the embodiments of this invention, the interfered cell may distinguish uplink-downlink interference based on the uplink-downlink configuration of the interfering cell, and send the uplink-downlink interference indication information to the interfering cell, so that interference coordination can be performed on uplink-downlink interference by the interfering cell. The problem in the prior art of merely capable of handling uplink-uplink interference and downlink-downlink interference, unable to distinguish uplink-downlink interference and perform interference coordination for uplink-downlink interference can be solved.

The difference of an interference coordination method in TDD systems provided in another embodiment of this invention, which has the same principle as the method shown in FIG. 3, is that while the interfered cell generates interference indication information for subframes in the interfered cell in a direction opposite to the signal transmission direction in the interfering cell according to a uplink-downlink configuration of the interfered cell and the uplink-downlink configuration of the interfering cell, it also generates interference indication information for subframes in the same direction as the signal transmission direction in the interfering cell, and sends both the interference indication information to the interfering cell, which performs a corresponding process on interference according to the interference indication information sent by the interfered cell. The method comprises the following steps:

601: an interfering cell sends a uplink-downlink configuration of the interfering cell to an interfered cell;

602: according to a uplink-downlink configuration of the interfered cell and the uplink-downlink configuration of the interfering cell, the interfered cell matches the signal transmission directions of corresponding subframes in the interfered cell and the interfering cell;

603: the interfered cell determines subframes in the interfered cell in a direction opposite to the signal transmission direction in the interfering cell;

As an illustration, referring to FIG. 3, subframe #0 in the interfered cell and subframe #0 in the interfering cell are both downlink subframes, which are subframes in the same signal transmission direction; subframe #2 in the interfered cell and subframe #2 in the interfering cell are both uplink subframes, which are subframes in the same signal transmission direction; similar to the above embodiment, subframe #3 in the interfered cell and subframe #3 in the interfering cell are subframes in different signal transmission directions. Further, the interfered cell may determine subframes in the interfered cell, which are in the same uplink or downlink direction as in the interfering cell.

604: the interfered cell generates interference indication information for the subframe in the interfered cell in a direction opposite to a signal transmission direction in the interfering cell and interference indication information for the subframes in the same direction as the signal transmission direction in the interfering cell;

Because the interference indication information for the subframes in a direction opposite to the signal transmission direction has been described in detail in the above embodiment, only the interference indication information for the subframes in the same direction as the signal transmission direction will be described herein, which for example may comprise the following steps:

1. The interfered cell obtains an interference measurement value of the subframes in the same direction as the signal transmission direction in the interfering cell;

As an illustration, the subframes in the same direction can be divided into two conditions, which will be described respectively below.

As to a subframe for which a signal in the interfered cell is uplink, and a signal in the interfering cell is uplink, the uplink signal in the interfered cell is interfered by the uplink signal in the interfering cell (referred to as uplink-to-uplink interference for simplicity), the interference measurement is performed by a BS of the interfered cell, which obtains an uplink-to-uplink interference measurement value through measuring the received signal power of uplink data channel or a pilot signal transmitted by a UE served by the interfering cell when it reaches the BS of the interfered cell;

As to a subframe for which a signal in the interfered cell is downlink and a signal in the interfering cell is downlink, the downlink signal in the interfered cell is interfered by the downlink signal in the interfering cell (referred to as downlink-to-downlink interference for simplicity), the interfered cell performs interference measurement through a UE it serves, wherein the UE served by the interfered cell obtains a downlink-to-downlink interference measurement value through measuring the received signal power of downlink data channel or a pilot signal transmitted by the BS of the interfering cell when it reaches the UE served by the interfered cell; the UE served by the interfered cell sends the interference measurement value to the BS of the interfered cell.

2. The interfered cell generates interference indication information according to the obtained interference measurement value. As an illustration, interference indication information for subframes in the same direction as the signal transmission direction may comprise interference strength level indication information at each resource granularity, or information indicating the interference impact on the interfered cell of the interfering cell at each resource granularity, the particular representation of which is the same as the above embodiment and will not be described repeatedly herein.

In addition, when the subframe in the interfered cell and the subframe in the interfering cell are both uplink subframes, the uplink signal in the interfered cell is interfered by the uplink signal in the interfering cell. The interference indication information may further comprise BS Relative Narrowband TX Power (RNTP) restrictions and High Interference Indicator (HII).

Wherein, RNTP indicates the downlink transmitted power of the interfered cell, in RNTP, the units are resource granularities, and each resource granularity comprises a PRB or several PRBs; 4 information bits are used for each resource granularity, indicating a transmitted power level at that resource granularity, wherein transmitted power levels $\in \{-\infty, -11, -10, -9, -8, -7, -6, -5, -4, -3, -2, -1, 0, +1, +2, +3\}$[dB], for example, each interference level is represented, in the order from low to high, by information bits "0000", "0001", "0010", "0011", . . . , "1111".

HII is used to indicate on which resource granularities the interfered cell may schedule cell edge users, for adjacent cells may be interfered on these resource granularities. In HII, the units are also resource granularities, and 1 bit is used for each resource granularity to indicate whether strong interference may occur on this resource granularity.

605: the interfered cell sends the uplink-downlink configuration of the interfered cell and the generated interference indication information to the interfering cell;

As an illustration, the interfered cell may select the sending method as in the above embodiment, which will not be described repeatedly herein.

606: the interfering cell performs interference coordination according to the uplink-downlink configuration of the interfered cell and the generated interference indication information.

As an illustration, performing by the interfering cell interference coordination according to the uplink-downlink configuration of the interfered cell and the generated interference indication information may comprise:

the interfering cell according to the uplink-downlink configuration of the interfered cell and the uplink-downlink configuration of the interfering cell determines subframes in the interfering cell causing uplink-downlink interference on the interfered cell and subframes causing uplink-uplink and downlink-downlink interference;

As an illustration, the particular method is the same as the matching process of the interfered cell, which will not be described repeatedly herein.

According to the interference indication information, the interfering cell adjusts the transmitted power of the subframes causing uplink-downlink interference, uplink-uplink interference, and downlink-downlink interference on the interfered cell, or adjusts resource locations used by UEs served by the interfering cell, so as to reduce or avoid interference caused on the interfered cell.

As an illustration, the adjustment method is the same as the above embodiment, except that transmitted power is adjusted for the BS or the UE respectively depending on different interference directions.

For example, when the interference indication information is information indicating the interference impact on the interfered cell of the interfering cell and the interference indication information at a resource granularity or several resource granularities is "10", representing a "strong" interference impact on the interfered cell's signal produced by the interfering cell's signal at that resource granularity or several resource granularities, the interfering cell may reduce the transmitted power of the BS of the interfering cell (for downlink-to-uplink and uplink-to-uplink interference) or UE (for uplink-to-downlink and downlink-to-downlink interference) at a corresponding resource granularity position, or schedule the downlink channel or the uplink channel to another resource granularity that does not generate a strong interference impact for transmission.

As an illustration, when the interference indication information received by the interfering cell is an interference indication containing RNTP and HII, the interfering cell schedules edge users in the interfering cell to resource granularities having lower interference strength levels in RNTP and HII to prevent strong interference caused on the interfered cell.

Similarly, when there are two or more interfering cells, referring to FIG. 5, cell 2 is the interfered cell, cell 1 and cell 3 are interfering cells, the interference coordination processes of cell 1 and cell 3 are independent with each other, for example, cell 1 and cell 3 send their respective subframe allocation configurations to cell 2, which determines subframes in a direction opposite to the signal transmission direction of cell 1 and subframes in the same direction as the signal transmission direction according to the uplink-downlink configurations of cell 1 and cell 2, and then generates interference indication information for cell 1, sends the uplink-downlink configuration of cell 2 and the interference indication information for cell 1 generated by cell 2 to cell 1, and cell 1 performs interference process according to the uplink-downlink configuration of cell 2 and the interference indication information generated by cell 2 for cell 1; cell 2 further determines subframes in a direction opposite to the signal transmission direction of cell 3 and subframes in the same direction as the signal transmission direction according to the uplink-downlink configurations of cell 2 and cell 3, and then generates interference indication information for cell 3, sends the uplink-downlink configuration of cell 2 and the interference indication information generated by cell 2 for cell 3 to cell 3, and cell 3 performs interference coordination according to the uplink-downlink configuration of cell 2 and the interference indication information generated by cell 2 for cell 3.

According to the interference coordination method in TDD systems provided in the embodiment of this invention, the interfered cell may distinguish uplink-downlink interference based on the uplink-downlink configuration of the interfering cell, and send the uplink-downlink interference indication information to the interfering cell, so that interference coordination can be performed on uplink-downlink interference by the interfering cell. The problem in the prior art of merely capable of handling uplink-uplink interference and downlink-downlink interference, unable to distinguish uplink-downlink interference, and unable to perform interference coordination for uplink-downlink interference can be solved.

Figure 7:
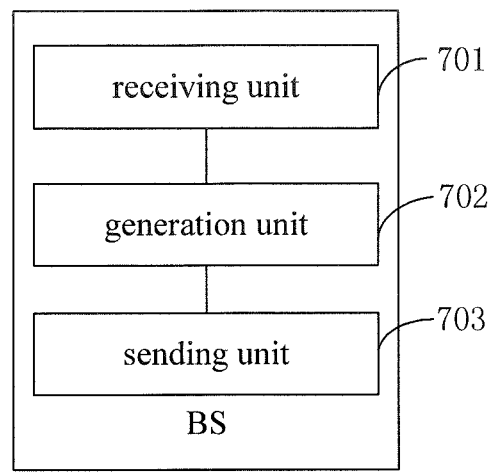
FIG. 7 is a structural diagram of another BS used in an interfered cell provided in an embodiment of this invention.
Figure 8:
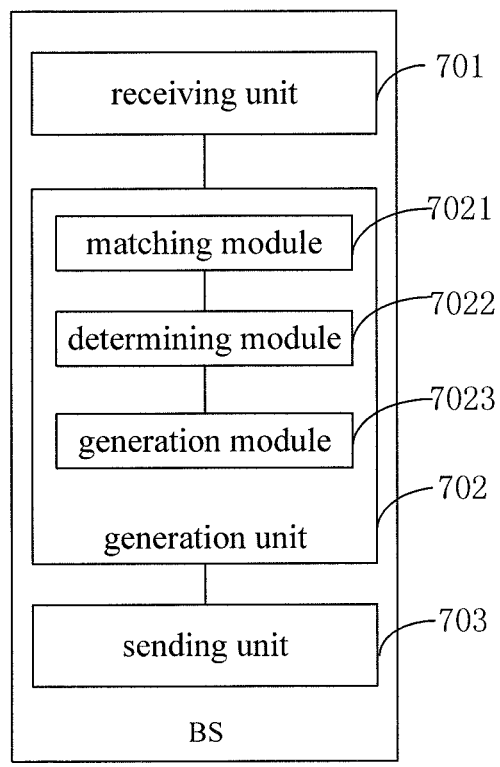
FIG. 8 is a structural diagram of another BS used in an interfered cell provided in an embodiment of this invention.
Figure 9:
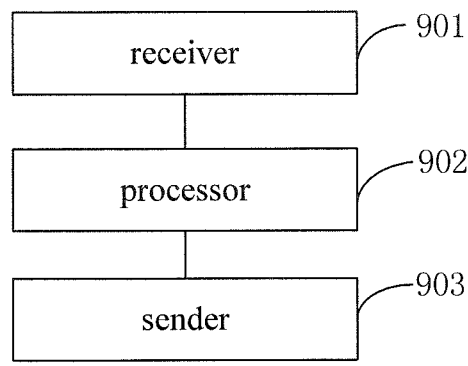
FIG. 9 is a structural diagram of another BS used in an interfered cell provided in an embodiment of this invention.

On another aspect, a BS used in an interfered cell is provided in an embodiment of this invention, referring to FIG. 7, the BS comprising:

A receiving unit 701, for receiving a uplink-downlink configuration of an interfering cell sent from the interfering cell;

In a TDD system, uplink and downlink signal transmissions occur in different time slots on the same frequency channel, in a single-carrier system, depending on different service traffic conditions, the uplink and downlink uplink-downlink configuration used in the system may be switched semi-dynamically. For example, the LTE TDD system defines seven uplink and downlink uplink-downlink configurations (also referred to as uplink-downlink configuration hereinafter for the convenience of description), as shown in table 1. Wherein, 'D' represents downlink subframes, 'U' represents uplink subframes, 'S' represents special subframes (including downlink transmission slots, guard time, and uplink transmission slots), and a cell may configure different uplink-downlink configurations to match its practical uplink and downlink data service requirements.

Referring to FIG. 4, assume that the uplink and downlink uplink-downlink configurations used in the interfered cell and the interfering cell are uplink-downlink configuration 1 and uplink-downlink configuration 2, respectively.

As an illustration, the receiving unit 701 receives the uplink-downlink configuration of the interfering cell in the following way:

receive the uplink-downlink configuration of the interfering cell through a X2 interface; or receive the uplink-downlink configuration of the interfering cell sent by a BS of the interfering cell, through an air interface, on a dedicated channel or a pilot signal; or receive the uplink-downlink configuration of the interfering cell sent by a UE served by the interfered cell which is obtained through receiving a system message of the interfering cell; or receive the uplink-downlink configuration of the interfering cell forwarded by an upper network.

A generation unit 702, for according to the uplink-downlink configuration of the interfered cell and the uplink-downlink configuration of the interfering cell, generating interference indication information for subframes in the interfered cell in a direction opposite to the signal transmission direction in the interfering cell;

As an illustration, the generation unit 702 may comprise:

A matching module 7021, for according to the uplink-downlink configuration of the interfered cell and the uplink-downlink configuration of the interfering cell, matching the signal transmission directions of corresponding subframes in the interfered cell and the interfering cell;

As an illustration, the matching module 7021 matches signal transmission directions of corresponding subframes in the interfered cell and the interfering cell.

For example, referring to FIG. 4, as to subframe #0, the signal transmission direction of the interfered cell is downlink, and the signal transmission direction of the interfering cell is downlink, and thus the interfered cell and the interfering cell have the same signal transmission direction at subframe #0; similarly, when the signal transmission direction of the interfered cell is uplink, and the signal transmission direction of the interfering cell is also uplink, interference on the interfered cell generated by the interfering cell is interference in the same direction, for example, interference on a downlink signal transmitted by the interfered cell which is generated by a downlink signal transmitted by the interfering cell; or interference on an uplink signal transmitted by a UE served by the interfered cell which is generated by an uplink signal transmitted by a UE served by the interfering cell.

Again, as to subframe #3, the signal transmission direction of the interfered cell is uplink, and the signal transmission direction of the interfering cell is downlink, and thus the interfered cell and the interfering cell have opposite signal transmission directions at subframe #3; similarly, when the signal transmission direction of the interfered cell is downlink, and the signal transmission direction of the interfering cell is uplink, the interfered cell and the interfering cell also have opposite signal transmission directions, and interference on the interfered cell generated by the interfering cell is uplink-downlink interference, for example, interference on an uplink signal transmitted by a UE served by the interfered cell which is generated by a downlink signal transmitted by the interfering cell; or interference on a downlink signal transmitted by the interfered cell which is generated by a uplink signal transmitted by a UE served by the interfering cell.

A determining module 7022, for determining a subframe in the interfered cell having a signal transmission direction opposite to that of the interfering cell according to the matching result of the matching module;

As an illustration, determining, by the determining module 7022, a subframe in the interfered cell having a signal transmission direction opposite to that of the interfering cell by the interfered cell according to the matching result of the determining module 7022 may comprise:

a subframe corresponding to that a signal in the interfered cell is downlink and a signal in the interfering cell is uplink;

a subframe corresponding to that a signal in the interfered cell is uplink and a signal in the interfering cell is downlink.

A generation module 7023, for generating interference indication information for the subframe in the interfered cell in a direction opposite to the signal transmission direction of the interfering cell determined by the determining module.

As an illustration, the generation module 7023 may comprise:

An obtaining submodule for obtaining an interference measurement value of the subframe in the interfered cell in a direction opposite to the signal transmission direction of the interfering cell;

As an illustration, as to a subframe for which a signal in the interfered cell is uplink and a signal in the interfering cell is a downlink, the uplink signal in the interfered cell is interfered by the downlink signal in the interfering cell (referred to as downlink-to-uplink interference for simplicity), the interference measurement is performed by a BS of the interfered cell, which obtains a downlink-uplink interference measurement value through measuring the received signal power of downlink data channel or a pilot signal transmitted by the interfering cell when it reaches the BS of the interfered cell;

As to a subframe for which a signal in the interfered cell is downlink and a signal in the interfering cell is uplink, the downlink signal in the interfered cell is interfered by the uplink signal in the interfering cell (referred to as uplink-to-downlink interference for simplicity), the interfered cell obtains an interference measurement value through a UE it serves; for example, comprising:

the BS of the interfered cell notifies the UE served by the interfered cell through control signaling of the position where the subframe having uplink-to-downlink interference locates, or the BS of the interfered cell notifies the UE served by the interfered cell through control signaling of the uplink-downlink configuration of the interfering cell, to enable the UE to be aware of the subframe having uplink-to-downlink interference by means of the interfered cell and the uplink-downlink configuration of the interfered cell;

the UE served by the interfered cell measures, on the subframe having uplink-to-downlink interference, the received signal power of uplink data channel or a pilot signal transmitted by the UE served by the interfering cell when it reaches the a UE served by the interfered cell, to obtain the uplink-to-downlink interference measurement value;

the UE served by the interfered cell sends the interference measurement value to the BS of the interfered cell.

Preferably, when the interference measurement is performed by the BS or UE, interference strength may be measured in a specific measurement time window for all or some of measurable subframes, after which interference measurement values that have been measured are averaged to finally obtain an interference measurement value corresponding to the measurement time window. Then, the operation is repeated for a next measurement time window.

A generation submodule for generating interference indication information for the subframe in the interfered cell in a direction opposite to the signal transmission direction of the interfering cell according to the interference measurement value obtained by the obtaining submodule.

As an illustration, the interference indication information may comprise: information indicating the interference strength level at each resource granularity, or information indicating the interference impact on the interfered cell of the interfering cell at each resource granularity.

For example:

1. Interference strength level indication information may be predetermined in the interfering cell and the interfered cell or systems where interfering cell and the interfered cell locate. For example, the predetermined interference strength level indication information may represent power levels by 4 bits and the power levels $\in\{-\infty, -11, -10, -9, -8, -7, -6, -5, -4, -3, -2, -1, 0, +1, +2, +3\}$[dB], wherein each power level is represented, in the order from low to high, by information bits "0000", "0001", "0010", "0011", . . . , "1111". The BS of the interfered cell quantifies the obtained interference measurement value, and for which predetermined interference strength level the quantified result corresponds to, its corresponding bit representation is used as the interference indication information. If the interference measurement value is quantified to −7.8 dB, "0010" is used as the interference indication information.

2. Information indicating the interference impact on the interfered cell of the interfering cell may be predetermined in the interfering cell and the interfered cell or systems where the interfering cell and the interfered cell locate. For example, two bits "00", "01", "10" may be used to represent "weak", "middle", "strong" interference impacts on the interfered cell of the interfering cell. The BS of the interfered cell compares the obtained interference measurement value and the effective received signal power of the interfered cell to obtain a received Signal to Interference Ratio (SIR). An interference impact threshold may be defined in advance. The interfered cell may compare the obtained SIR and the threshold, for example, when the SIR exceeds the threshold, it indicates strong interference and the interference indication information is represented by "10"; when the SIR is below than the threshold, it indicates weak interference and the interference indication information is represented by "00"; when the SIR is close to the threshold, it indicates middle interference and the interference indication information is represented by "01".

As an illustration, the interference indication information may comprise interference indication information at each resource granularity, wherein a resource granularity may comprise a physical resource block (PRB) or several PRBs, and there is not limitation on the specific representation form of the interference indication information. For example, the interference indication information may be wide-band interference indication information, i.e., a piece of interference indication information generated for the whole system bandwidth, comprising interference indication information for each resource granularity for the whole system bandwidth; or the interference indication information may be narrow-band interference indication information, i.e., the entire system bandwidth is divided into multiple frequency bands, and a piece of interference indication information is generated for each frequency band, comprising interference indication information for each resource granularity in the frequency band. Due to frequency selectivity of interference, interference indication information for multiple narrow bands is benefit for interference coordination carried out on separate frequency bands; or the interference indication information may comprise both wide-band interference indication information and narrow-band interference indication information.

The generation unit 702 is further used to generate interference indication information for a subframe in the interfered cell in the same direction as the signal transmission direction in the interfering cell according to the uplink-downlink configuration of the interfered cell and the uplink-downlink configuration of the interfering cell.

As an illustration, referring to FIG. 4, subframe #0 in the interfered cell and subframe #0 in the interfering cell are both downlink subframes, which are subframes in the same signal transmission direction; subframe #2 in the interfered cell and subframe #2 in the interfering cell are both uplink subframes, which are subframes in the same signal transmission direction; similar to the above embodiment, subframe #3 in the interfered cell and subframe #3 in the interfering cell are subframes in different signal transmission directions.

As an illustration, according to the uplink-downlink configuration of the interfered cell and the uplink-downlink configuration of the interfering cell, generating interference indication information for the subframe in the interfered cell in the same direction as the signal transmission direction in the interfering cell by the generation unit 702 may comprise:

1. the generation unit 702 obtains an interference measurement value of the subframes in the same direction as the signal transmission direction in the interfering cell;

As an illustration, the subframes in the same direction can be divided into two conditions, which will be described respectively below.

As to a subframe for which a signal in the interfered cell is uplink, and a signal in the interfering cell is uplink, the uplink signal in the interfered cell is interfered by the uplink signal in the interfering cell (referred to as uplink-to-uplink interference for simplicity), the interference measurement is performed by a BS of the interfered cell, which obtains an uplink-to-uplink interference measurement value through measuring the received signal power of uplink data channel or a pilot signal transmitted by a UE served by the interfering cell when it reaches the BS of the interfered cell;

As to a subframe for which a signal in the interfered cell is downlink and a signal in the interfering cell is downlink, the downlink signal in the interfered cell is interfered by the downlink signal in the interfering cell (referred to as downlink-to-downlink interference for simplicity), the interfered cell obtains an interference measurement value through a UE it serves, wherein the UE served by the interfered cell obtains a downlink-to-downlink interference measurement value through measuring the received signal power of uplink data channel or a pilot signal transmitted by the BS of the interfering cell when it reaches the UE served by the interfered cell; the UE served by the interfered cell sends the interference measurement value to the BS of the interfered cell.

2. the generation unit 702 generates interference indication information for subframes in the interfered cell in the same direction as the signal transmission direction in the interfering cell according to uplink-downlink configuration of the interfered cell and the uplink-downlink configuration of the interfering cell.

As an illustration, interference indication information for subframes in the same direction as the signal transmission direction may comprise interference strength level indication information at each resource granularity, or information indicating the interference impact on the interfered cell of the interfering cell at each resource granularity, the particular representation of which is the same as the above embodiment and will not be described repeatedly herein.

In addition, when the subframe in the interfered cell and the subframe in the interfering cell are both uplink subframes, the uplink signal in the interfered cell is interfered by the uplink signal in the interfering cell. The interference indication information may further comprise BS Relative Narrowband TX Power (RNTP) restrictions and High Interference Indicator (HII).

Wherein, RNTP indicates the downlink transmitted power of the interfered cell, in RNTP, the units are resource granularities, and each resource granularity comprises a PRB or several PRBs; 4 information bits are used for each resource granularity, indicating a transmitted power level at that resource granularity, wherein transmitted power levels∈{−∞, −11, −10, −9, −8, −7, −6, −5, −4, −3, −2, −1, 0, +1, +2, +3}[dB], for example, each interference level is represented, in the order from low to high, by information bits "0000", "0001", "0010", "0011", . . . , "1111".

HII is used to indicate on which resource granularities the interfered cell may schedule cell edge users, for adjacent cells may be interfered on these resource granularities. In HII, the units are also resource granularities, and 1 bit is used for each resource granularity to indicate whether strong interference may occur on this resource granularity.

A sending unit 703 for sending the uplink-downlink configuration of the interfered cell and the interference indication information to the interfering cell, to enable the interfering cell to perform interference coordination according to the uplink-downlink configuration of the interfered cell and the interference indication information.

As an illustration, the sending unit 703 may send the interference indication information to the interfering cell in the following way:

send the interference indication information to the BS of the interfering cell through a X2 interface;

send the interference indication information to the BS of the interfering cell through an air interface on a dedicated channel or a pilot signal; or send, through a backhaul link or S1 interface, the interference indication information to an upper level network centralized controller, which then forwards it to the BS of the interfering cell.

The BS further comprises an update period setting unit 704, for setting an update period. Correspondingly, the generation unit 702 is further used to: according to the uplink-downlink configuration of the interfered cell, the uplink-downlink configuration of the interfering cell and the update period set by the update period setting unit, generating interference indication information in each update period for subframes in the interfered cell in a direction opposite to the signal transmission direction in the interfering cell;

The sending unit 703 is further used to: according to the update period set by the update period setting unit, send in each update period the uplink-downlink configuration of the interfered cell and the interference indication information in each update period to the interfering cell, to enable the interfering cell to perform interference coordination in each update period according to the uplink-downlink configuration of the interfered cell and the interference indication information in each update period.

According to the BS provided in the embodiment of this invention, the interfered cell may distinguish uplink-downlink interference based on the uplink-downlink configuration of the interfering cell, and send the uplink-downlink interference indication information to the interfering cell, so that interference coordination can be performed on uplink-downlink interference by the interfering cell. The problem in the prior art of merely capable of handling uplink-uplink interference and downlink-downlink interference, unable to distinguish uplink-downlink interference, and unable to perform interference coordination for uplink-downlink interference can be solved.

A BS is provided in another embodiment of this invention, which may execute all steps shown in FIG. 1, comprising:

A receiver 901 for receiving a uplink-downlink configuration of an interfering cell sent from the interfering cell;

In a TDD system, uplink and downlink signal transmissions occur in different time slots on the same frequency channel, in a single-carrier system, depending on different service traffic conditions, the uplink and downlink uplink-downlink configuration used in the system may be switched semi-dynamically. For example, the LTE TDD system defines seven uplink and downlink uplink-downlink configurations (also referred to as uplink-downlink configuration hereinafter for the convenience of description), as shown in table 1. Wherein, 'D' represents downlink subframes, 'U' represents uplink subframes, 'S' represents special subframes (including downlink transmission slots, guard time, and uplink transmission slots), and a cell may configure different uplink-downlink configurations to match its practical uplink and downlink data service requirements.

Referring to FIG. 4, assume that the uplink and downlink uplink-downlink configurations used in the interfered cell and the interfering cell are uplink-downlink configuration 1 and uplink-downlink configuration 2, respectively.

As an illustration, the receiver 901 may receive the uplink-downlink configuration of the interfering cell in the following way:

receive the uplink-downlink configuration of the interfering cell through a X2 interface; or receive the uplink-downlink configuration of the interfering cell sent by a BS of the interfering cell, through an air interface, on a dedicated channel or a pilot signal; or receive the uplink-downlink configuration of the interfering cell sent by a UE served by the interfered cell which is obtained through receiving a system message of the interfering cell; or receive the uplink-downlink configuration of the interfering cell forwarded by an upper network.

A processor 902, for according to the uplink-downlink configuration of the interfered cell and the uplink-downlink configuration of the interfering cell, generating interference indication information for subframes in the interfered cell in a direction opposite to the signal transmission direction in the interfering cell;

As an illustration, the processor 902 may, according to the uplink-downlink configuration of the interfered cell and the uplink-downlink configuration of the interfering cell, match the signal transmission directions of corresponding subframes in the interfered cell and the interfering cell; according to the matching result, determine subframes in the interfered cell in a direction opposite to the signal transmission direction in the interfering cell; then generate interference indication information for the subframe in the interfered cell in a direction opposite to the signal transmission direction in the interfering cell.

For example, referring to FIG. 4, as to subframe #0, the signal transmission direction of the interfered cell is downlink, and the signal transmission direction of the interfering cell is downlink, and thus the interfered cell and the interfering cell have the same signal transmission direction at subframe #0; similarly, when the signal transmission direction of the interfered cell is uplink, and the signal transmission direction of the interfering cell is also uplink, interference on the interfered cell generated by the interfering cell is interference in the same direction, for example, interference on a downlink signal transmitted by the interfered cell which is generated by a downlink signal transmitted by the interfering cell; or interference on an uplink signal transmitted by a UE served by the interfered cell which is generated by an uplink signal transmitted by a UE served by the interfering cell.

Again, as to subframe #3, the signal transmission direction of the interfered cell is uplink, and the signal transmission direction of the interfering cell is downlink, and thus the interfered cell and the interfering cell have opposite signal transmission directions at subframe #3; similarly, when the signal transmission direction of the interfered cell is downlink, and the signal transmission direction of the interfering cell is uplink, the interfered cell and the interfering cell also have opposite signal transmission directions, and interference on the interfered cell generated by the interfering cell is uplink-downlink interference, for example, interference on an uplink signal transmitted by a UE served by the interfered cell which is generated by a downlink signal transmitted by the interfering cell; or interference on a downlink signal transmitted by the interfered cell which is generated by a uplink signal transmitted by a UE served by the interfering cell.

As an illustration, a subframe in the interfered cell in a direction opposite to the signal transmission direction in the interfering cell may comprise:

a subframe corresponding to that a signal in the interfered cell is downlink and a signal in the interfering cell is uplink;

a subframe corresponding to that a signal in the interfered cell is uplink and a signal in the interfering cell is downlink.

As an illustration, as to a subframe for which a signal in the interfered cell is uplink and a signal in the interfering cell is a downlink, the uplink signal in the interfered cell is interfered by the downlink signal in the interfering cell (referred to as downlink-to-uplink interference for simplicity), the interference measurement is performed by a BS of the interfered cell, which obtains a downlink-to-uplink interference measurement value through measuring the received signal power of downlink data channel or a pilot signal transmitted by a BS of the interfering cell when it reaches the BS of the interfered cell;

As to a subframe for which a signal in the interfered cell is downlink and a signal in the interfering cell is uplink, the downlink signal in the interfered cell is interfered by the uplink signal in the interfering cell (referred to as uplink-to-downlink interference for simplicity), the interfered cell obtains an interference measurement value through a UE it serves.

Preferably, when the measurement is performed by the BS or UE, interference strength may be measured in a specific measurement time window for all or some of measurable subframes, after which interference measurement values that have been measured are averaged to finally obtain an interference measurement value corresponding to the measurement time window. Then, the operation is repeated for a next measurement time window.

The processor 902 then generates interference indication information for the subframes in the interfered cell in a direction opposite to the signal transmission direction of the interfering cell according to the interference measurement value.

As an illustration, the interference indication information may comprise: information indicating the interference strength level at each resource granularity, or information indicating the interference impact on the interfered cell of the interfering cell at each resource granularity.

For example:

1. Interference strength level indication information may be predetermined in the interfering cell and the interfered cell or systems where interfering cell and the interfered cell locate. For example, the predetermined interference strength level indication information may represent power levels by 4 bits and the power levels $\in \{-\infty, -11, -10, -9, -8, -7, -6, -5, -4, -3, -2, -1, 0, +1, +2, +3\}$[dB], wherein each power level is represented, in the order from low to high, by information bits "0000", "0001", "0010", "0011", . . . , "1111". The BS of the interfered cell quantifies the obtained interference measurement value, and for which predetermined interference strength level the quantified result corresponds to, its corresponding bit representation is used as the interference indication information. If the interference measurement value is quantified to −7.8 dB, "0010" is used as the interference indication information.

2. Information indicating the interference impact on the interfered cell of the interfering cell may be predetermined in the interfering cell and the interfered cell or systems where the interfering cell and the interfered cell locate. For example, two bits "00", "01", "10" may be used to represent "weak", "middle", "strong" interference impacts on the interfered cell of the interfering cell. The BS of the interfered cell compares the obtained interference measurement value and the effective received signal power of the interfered cell to obtain a received Signal to Interference Ratio (SIR). An interference impact threshold may be defined in advance. The interfered cell may compare the obtained SIR and the threshold, for example, when the SIR exceeds the threshold, it indicates strong interference and the interference indication information is represented by "10"; when the SIR is below than the threshold, it indicates weak interference and the interference indication information is represented by "00"; when the SIR is close to the threshold, it indicates middle interference and the interference indication information is represented by "01".

As an illustration, the interference indication information may comprise interference indication information at each resource granularity, wherein a resource granularity may comprise a physical resource block (PRB) or several PRBs, and there is not limitation on the specific representation form of the interference indication information. For example, the interference indication information may be wide-band interference indication information, i.e., a piece of interference indication information generated for the whole system bandwidth, comprising interference indication information for each resource granularity for the whole system bandwidth; or the interference indication information may be narrow-band interference indication information, i.e., the entire system bandwidth is divided into multiple frequency bands, and a piece of interference indication information is generated for each frequency band, comprising interference indication information for each resource granularity in the frequency band. Due to frequency selectivity of interference, interference indication information for multiple narrow bands is benefit for interference coordination carried out on separate frequency bands; or the interference indication information may comprise both wide-band interference indication information and narrow-band interference indication information.

In addition, the processor 902 is further used to generate interference indication information for a subframe in the interfered cell in the same direction as the signal transmission direction in the interfering cell according to the uplink-downlink configuration of the interfered cell and the uplink-downlink configuration of the interfering cell.

As an illustration, referring to FIG. 4, subframe #0 in the interfered cell and subframe #0 in the interfering cell are both downlink subframes, which are subframes in the same signal transmission direction; subframe #2 in the interfered cell and subframe #2 in the interfering cell are both uplink subframes, which are subframes in the same signal transmission direction; similar to the above embodiment, subframe #3 in the interfered cell and subframe #3 in the interfering cell are subframes in different signal transmission directions.

As an illustration, according to the uplink-downlink configuration of the interfered cell and the uplink-downlink configuration of the interfering cell, generating interference indication information for the subframe in the interfered cell in the same direction as the signal transmission direction by the processor 902 may comprise:

1. the processor 902 obtains an interference measurement value of the subframes in the same direction as the signal transmission direction in the interfering cell;

As an illustration, the subframes in the same direction can be divided into two conditions, which will be described respectively below.

As to a subframe for which a signal in the interfered cell is uplink, and a signal in the interfering cell is uplink, the uplink signal in the interfered cell is interfered by the uplink signal in the interfering cell (referred to as uplink-to-uplink interference for simplicity), the interference measurement is performed by a BS of the interfered cell, which obtains an uplink-to-uplink interference measurement value through measuring the received signal power of uplink data channel or a pilot signal transmitted by a UE served by the interfering cell when it reaches the BS of the interfered cell;

As to a subframe for which a signal in the interfered cell is downlink and a signal in the interfering cell is downlink, the downlink signal in the interfered cell is interfered by the downlink signal in the interfering cell (referred to as downlink-to-downlink interference for simplicity), the interfered cell obtains an interference measurement value through a UE it serves, wherein the UE served by the interfered cell obtains a downlink-to-downlink interference measurement value through measuring the received signal power of downlink data channel or a pilot signal transmitted by the BS of the interfering cell when it reaches the UE served by the interfered cell; the UE served by the interfered cell sends the interference measurement value to the BS of the interfered cell.

2. the processor 902 generates interference indication information for subframes in the interfered cell in the same direction as the signal transmission direction in the interfering cell according to uplink-downlink configuration of the interfered cell and the uplink-downlink configuration of the interfering cell.

As an illustration, interference indication information for subframes in the same direction as the signal transmission direction may comprise interference strength level indication information at each resource granularity, or information indicating the interference impact on the interfered cell of the interfering cell at each resource granularity, the particular representation of which is the same as the above embodiment and will not be described repeatedly herein.

In addition, when the subframe in the interfered cell and the subframe in the interfering cell are both uplink subframes, the uplink signal in the interfered cell is interfered by the uplink signal in the interfering cell. The interference indication information may further comprise BS Relative Narrowband TX Power (RNTP) restrictions and High Interference Indicator (HII).

Wherein, RNTP indicates the downlink transmitted power of the interfered cell, in RNTP, the units are resource granularities, and each resource granularity comprises a PRB or several PRBs; 4 information bits are used for each resource granularity, indicating a transmitted power level at that resource granularity, wherein transmitted power levels∈{−∞, −11, −10, −9, −8, −7, −6, −5, −4, −3, −2, −1, 0, +1, +2, +3}[dB], for example, each interference level is represented, in the order from low to high, by information bits "0000", "0001", "0010", "0011", . . . , "1111".

HII is used to indicate on which resource granularities the interfered cell may schedule cell edge users, for adjacent cells may be interfered on these resource granularities. In HII, the units are also resource granularities, and 1 bit is used for each resource granularity to indicate whether strong interference may occur on this resource granularity.

A sender 903 for sending the uplink-downlink configuration of the interfered cell and the interference indication information to the interfering cell, to enable the interfering cell to perform interference coordination according to the uplink-downlink configuration of the interfered cell and the interference indication information.

As an illustration, the sender 903 may send the interference indication information to the interfering cell in the following way:

send the interference indication information to the BS of the interfering cell through a X2 interface;

send the interference indication information to the BS of the interfering cell through an air interface on a dedicated channel or a pilot signal; or send, through a backhaul link or S1 interface, the interference indication information to an upper level network centralized controller, which then forwards it to the BS of the interfering cell.

According to the BS provided in the embodiment of this invention, the interfered cell may distinguish uplink-downlink interference based on the uplink-downlink configuration of the interfering cell, and send the uplink-downlink interference indication information to the interfering cell, so that interference coordination can be performed on uplink-downlink interference by the interfering cell. The problem in the prior art of merely capable of handling uplink-uplink interference and downlink-downlink interference, unable to distinguish uplink-downlink interference, and unable to perform interference coordination for uplink-downlink interference can be solved.

Figure 10:
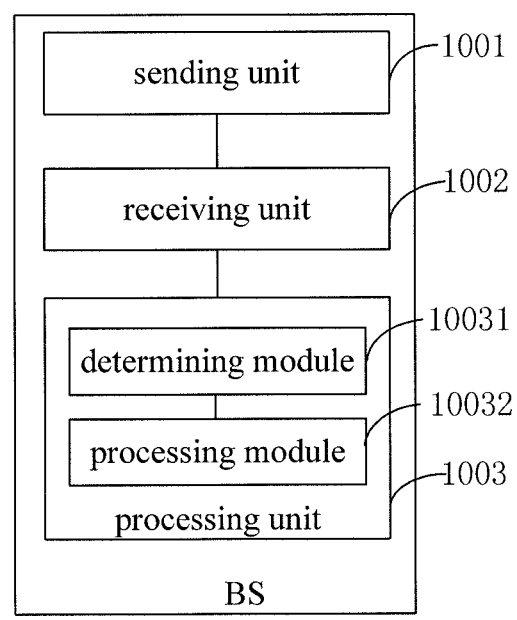
FIG. 10 is a structural diagram of a BS used in an interfering cell provided in an embodiment of this invention.

A BS used in an interfering cell is provided in another embodiment of this invention, which may execute all steps shown in FIG. 2, referring to FIG. 10, comprising:

A sending unit 1001 for sending a uplink-downlink configuration of an interfering cell to an interfered cell;

As an illustration, the sending unit 1001 may send the uplink-downlink configuration of the interfering cell in the following way:

send the uplink-downlink configuration of the interfering cell to a BS of the interfered cell through a X2 interface; or send the uplink-downlink configuration of the interfering cell to the BS of the interfered cell, through an air interface, on a dedicated channel or a pilot signal; or send a system message to a UE served by the interfered cell, to enable the UE to obtain the uplink-downlink configuration of the interfering cell, and then send the uplink-downlink configuration of the interfering cell to the BS of the interfered cell; or forward the uplink-downlink configuration of the interfering cell to the BS of the interfered cell through an upper network.

A receiving unit 1002, which is used to receive the uplink-downlink configuration of interfered cell sent from the interfered cell and interference indication information for subframes in the interfered cell in a direction opposite to the signal transmission direction in the interfering cell, which is generated by the interfered cell according to a uplink-downlink configuration of the interfered cell and the uplink-downlink configuration of the interfering cell;

Further, the receiving unit 1002 is further used to receive interference indication information for subframes in the interfered cell in the same direction as the signal transmission direction in the interfering cell, which is generated by the interfered cell according to the uplink-downlink configuration of the interfered cell and the uplink-downlink configuration of the interfering cell, and is sent by the interfered cell.

As an illustration, subframes in the interfered cell in a direction opposite to the signal transmission direction in the interfering cell may comprise at least one of the following subframes:

a subframe corresponding to that a signal in the interfered cell is downlink and a signal in the interfering cell is uplink;

a subframe corresponding to that a signal in the interfered cell is uplink and a signal in the interfering cell is downlink.

subframes in the interfered cell in the same direction as the signal transmission direction in the interfering cell may comprise at least one of the following subframes:

a subframe corresponding to that a signal in the interfered cell is downlink, and a signal in the interfering cell is downlink;

a subframe corresponding to that a signal in the interfered cell is uplink, and the signal in the interfering cell is uplink.

For example, referring to FIG. 3, subframe #0 in the interfered cell and subframe #0 in the interfering cell are both downlink subframes, which are subframes in the same signal transmission direction; subframe #2 in the interfered cell and subframe #2 in the interfering cell are both uplink subframes, which are subframes in the same signal transmission direction; subframe #3 in the interfered cell and subframe #3 in the interfering cell are subframes in different signal transmission directions.

As an illustration, the interference indication information may comprise: information indicating the interference strength level at each resource granularity, or information indicating the interference impact on the interfered cell of the interfering cell at each resource granularity.

For example:

1. Interference strength level indication information may be predetermined in the interfering cell and the interfered cell or systems where interfering cell and the interfered cell locate. For example, the predetermined interference strength level indication information may represent power levels by 4 bits and the power levels∈{−∞, −11, −10, −9, −8, −7, −6, −5, −4, −3, −2, −1, 0, +1, +2, +3}[dB], wherein each power level is represented, in the order from low to high, by information bits "0000", "0001", "0010", "0011", . . . , "1111". The BS of the interfered cell quantifies the obtained interference measurement value, and for which predetermined interference strength level the quantified result corresponds to, its corresponding bit representation is used as the interference indication information. If the interference measurement value is quantified to −7.8 dB, "0010" is used as the interference indication information.

2. Information indicating the interference impact on the interfered cell of the interfering cell may be predetermined in the interfering cell and the interfered cell or systems where the interfering cell and the interfered cell locate. For example, two bits "00", "01", "10" may be used to represent "weak", "middle", "strong" interference impacts on the interfered cell of the interfering cell. The BS of the interfered cell compares the obtained interference measurement value and the effective received signal power of the interfered cell to obtain a received Signal to Interference Ratio (SIR). An interference impact threshold may be defined in advance. The interfered cell may compare the obtained SIR and the threshold, for example, when the SIR exceeds the threshold, it indicates strong interference and the interference indication information is represented by "10"; when the SIR is below than the threshold, it indicates weak interference and the interference indication information is represented by "00"; when the SIR is close to the threshold, it indicates middle interference and the interference indication information is represented by "01".

As an illustration, the interference indication information may comprise interference indication information at each resource granularity, wherein a resource granularity may comprise a physical resource block (PRB) or several PRBs, and there is not limitation on the specific representation form of the interference indication information. For example, the interference indication information may be wide-band interference indication information, i.e., a piece of interference indication information generated for the whole system bandwidth, comprising interference indication information for each resource granularity for the whole system bandwidth; or the interference indication information may be narrow-band interference indication information, i.e., the entire system bandwidth is divided into multiple frequency bands, and a piece of interference indication information is generated for each frequency band, comprising interference indication information for each resource granularity in the frequency band. Due to frequency selectivity of interference, interference indication information for multiple narrow bands is benefit for interference coordination carried out on separate frequency bands; or the interference indication information may comprise both wide-band interference indication information and narrow-band interference indication information.

In addition, when the subframe in the interfered cell and the subframe in the interfering cell are both uplink subframes, the uplink signal in the interfered cell is interfered by the uplink signal in the interfering cell. The interference indication information may further comprise BS Relative Narrowband TX Power (RNTP) restrictions and High Interference Indicator (HII).

Wherein, RNTP indicates the downlink transmitted power of the interfered cell, in RNTP, the units are resource granularities, and each resource granularity comprises a PRB or several PRBs; 4 information bits are used for each resource granularity, indicating a transmitted power level at that resource granularity, wherein transmitted power levels∈{−∞, −11, −10, −9, −8, −7, −6, −5, −4, −3, −2, −1, 0, +1, +2, +3}[dB], for example, each interference level is represented, in the order from low to high, by information bits "0000", "0001", "0010", "0011", . . . , "1111".

HII is used to indicate on which resource granularities the interfered cell may schedule cell edge users, for adjacent cells may be interfered on these resource granularities. In HII, the units are also resource granularities, and 1 bit is used for each resource granularity to indicate whether strong interference may occur on this resource granularity.

A processing unit 1003, which is used to perform interference coordination according to the uplink-downlink configuration of the interfering cell and the interference indication information received by the receiving unit.

As an illustration, the processing unit 1003 may comprise:

A determining module 10031, which is used to, according to the uplink-downlink configuration of the interfered cell and the uplink-downlink configuration of the interfering cell, determine subframes in the interfering cell causing uplink-downlink interference on the interfered cell and subframes causing uplink-uplink and downlink-downlink interference;

A processing module 10032, which is used to, according to the interference indication information received by the receiving unit, adjust the transmitted power of the subframes causing uplink-downlink interference, uplink-uplink interference, and downlink-downlink interference on the interfered cell, or adjusts resource locations used by UEs served by the interfering cell, so as to reduce or avoid interference caused on the interfered cell.

As an illustration, the processing module 10032 adjusts the transmitted power for the BS or the UE respectively depending on requirements in different interference directions.

For example, when the interference indication information is information indicating the interference impact on the interfered cell of the interfering cell and the interference indication information at a resource granularity or several resource granularities is "10", representing a "strong" interference impact on the interfered cell's signal produced by the interfering cell's signal at that resource granularity or several resource granularities, the interfering cell may reduce the transmitted power of the BS of the interfering cell (for downlink-to-uplink and uplink-to-uplink interference) or UE (for uplink-to-downlink and downlink-to-downlink interference) at a corresponding resource granularity position, or schedule the downlink channel or the uplink channel to another resource granularity that does not generate a strong interference impact for transmission.

As an illustration, when the interference indication information received by the receiving module 1002 is an interference indication containing RNTP and HII, the processing module 10032 schedules edge users in the interfering cell to resource granularities having lower interference strength levels in RNTP and HII to prevent strong interference caused on the interfered cell.

The BS may further comprise an update period setting unit 1004, which is used to set an update period. Correspondingly, the receiving module 1002 is further used to, according to the update period set by the update period setting unit 1004, in each update period, receive the uplink-downlink configuration of the interfered cell sent from the interfered cell, and the interference indication information for subframes in the interfered cell in a direction opposite to the signal transmission direction of the interfering cell generated by the interfered cell in each update period according to the uplink-downlink configuration of the interfered cell and the uplink-downlink configuration of the interfering cell;

The processing module 10032 is further used to, according to the update period set by the update period setting unit 1004, in each update period, perform interference coordination according to the uplink-downlink configuration of the interfered cell and the interference indication information in each update period.

According to the BS provided in the embodiment of this invention, sends the uplink-downlink configuration to the interfered cell, so that the interfered cell may distinguish uplink-downlink interference based on the uplink-downlink configuration of the interfering cell and generate uplink-downlink interference indication information, so that the BS can perform interference coordination based on the uplink-downlink interference indication information. The problem in the prior art of merely capable of handling uplink-uplink interference and downlink-downlink interference, unable to distinguish uplink-downlink interference, and unable to perform interference coordination for uplink-downlink interference can be solved.

Figure 11:
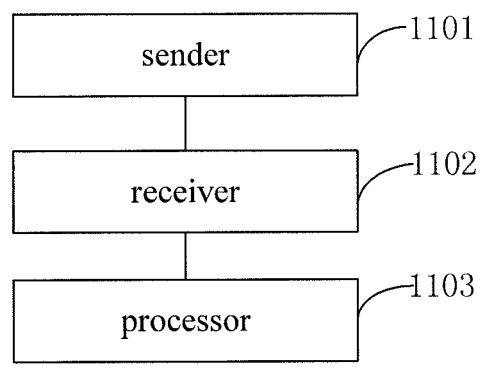
FIG. 11 is a structural diagram of another BS used in an interfering cell provided in an embodiment of this invention.

A BS used in an interfering cell is provided in another embodiment of this invention, which may execute all steps shown in FIG. 2, referring to FIG. 11, comprising:

A sender 1101, which is used to send a uplink-downlink configuration of an interfering cell to an interfered cell;

As an illustration, the sender 1101 may send the uplink-downlink configuration to the interfered cell in the following way:

send the uplink-downlink configuration of the interfering cell to a BS of the interfered cell through a X2 interface; or send the uplink-downlink configuration of the interfering cell to the BS of the interfered cell, through an air interface, on a dedicated channel or a pilot signal; or send a system message to a UE served by the interfered cell, to enable the UE to obtain the uplink-downlink configuration of the interfering cell, and then send the uplink-downlink configuration of the interfering cell to the BS of the interfered cell; or forward the uplink-downlink configuration of the interfering cell to the BS of the interfered cell through an upper network.

A receiver 1102, which is used to receive the uplink-downlink configuration of interfered cell sent from the interfered cell and interference indication information for subframes in the interfered cell in a direction opposite to the signal transmission direction in the interfering cell, which is generated by the interfered cell according to a uplink-downlink configuration of the interfered cell and the uplink-downlink configuration of the interfering cell;

Further, the receiver 1102 is further used to receive interference indication information for subframes in the interfered cell in the same direction as the signal transmission direction in the interfering cell, which is generated by the interfered cell according to the uplink-downlink configuration of the interfered cell and the uplink-downlink configuration of the interfering cell, and is sent by the interfered cell.

As an illustration, subframes in the interfered cell in a direction opposite to the signal transmission direction in the interfering cell may comprise at least one of the following subframes:

a subframe corresponding to that a signal in the interfered cell is downlink and a signal in the interfering cell is uplink;

a subframe corresponding to that a signal in the interfered cell is uplink and a signal in the interfering cell is downlink.

subframes in the interfered cell in the same direction as the signal transmission direction in the interfering cell may comprise at least one of the following subframes:

a subframe corresponding to that a signal in the interfered cell is downlink, and a signal in the interfering cell is downlink;

a subframe corresponding to that a signal in the interfered cell is uplink, and a signal in the interfering cell is uplink.

For example, referring to FIG. 3, subframe #0 in the interfered cell and subframe #0 in the interfering cell are both downlink subframes, which are subframes in the same signal transmission direction; subframe #2 in the interfered cell and subframe #2 in the interfering cell are both uplink subframes, which are subframes in the same signal transmission direction; subframe #3 in the interfered cell and subframe #3 in the interfering cell are subframes in different signal transmission directions.

As an illustration, the interference indication information may comprise: information indicating the interference strength level at each resource granularity, or information indicating the interference impact on the interfered cell of the interfering cell at each resource granularity.

For example:

1. Interference strength level indication information may be predetermined in the interfering cell and the interfered cell or systems where interfering cell and the interfered cell locate. For example, the predetermined interference strength level indication information may represent power levels by 4 bits and the power levels$\epsilon\{-\infty, -11, -10, -9, -8, -7, -6, -5, -4, -3, -2, -1, 0, +1, +2, +3\}$[dB], wherein each power level is represented, in the order from low to high, by information bits "0000", "0001", "0010", "0011", . . . , "1111". The BS of the interfered cell quantifies the obtained interference measurement value, and for which predetermined interference strength level the quantified result corresponds to, its corresponding bit representation is used as the interference indication information. If the interference measurement value is quantified to −7.8 dB, "0010" is used as the interference indication information.

2. Information indicating the interference impact on the interfered cell of the interfering cell may be predetermined in the interfering cell and the interfered cell or systems where the interfering cell and the interfered cell locate. For example, two bits "00", "01", "10" may be used to represent "weak", "middle", "strong" interference impacts on the interfered cell of the interfering cell. The BS of the interfered cell compares the obtained interference measurement value and the effective received signal power of the interfered cell to obtain a received Signal to Interference Ratio (SIR). An interference impact threshold may be defined in advance. The interfered cell may compare the obtained SIR and the threshold, for example, when the SIR exceeds the threshold, it indicates strong interference and the interference indication information is represented by "10"; when the SIR is below than the threshold, it indicates weak interference and the interference indication information is represented by "00"; when the SIR is close to the threshold, it indicates middle interference and the interference indication information is represented by "01".

As an illustration, the interference indication information may comprise interference indication information at each resource granularity, wherein a resource granularity may comprise a physical resource block (PRB) or several PRBs, and there is not limitation on the specific representation form of the interference indication information. For example, the interference indication information may be wide-band interference indication information, i.e., a piece of interference indication information generated for the whole system bandwidth, comprising interference indication information for each resource granularity for the whole system bandwidth; or the interference indication information may be narrow-band interference indication information, i.e., the entire system bandwidth is divided into multiple frequency bands, and a piece of interference indication information is generated for each frequency band, comprising interference indication information for each resource granularity in the frequency band. Due to frequency selectivity of interference, interference indication information for multiple narrow bands is benefit for interference coordination carried out on separate frequency bands; or the interference indication information may comprise both wide-band interference indication information and narrow-band interference indication information.

In addition, when the subframe in the interfered cell and the subframe in the interfering cell are both uplink subframes, the uplink signal in the interfered cell is interfered by the uplink signal in the interfering cell. The interference indication information may further comprise BS Relative Narrowband TX Power (RNTP) restrictions and High Interference Indicator (HII).

Wherein, RNTP indicates the downlink transmitted power of the interfered cell, in RNTP, the units are resource granularities, and each resource granularity comprises a PRB or several PRBs; 4 information bits are used for each resource granularity, indicating a transmitted power level at that resource granularity, wherein transmitted power levels $\in \{-\infty, -11, -10, -9, -8, -7, -6, -5, -4, -3, -2, -1, 0, +1, +2, +3\}$[dB], for example, each interference level is represented, in the order from low to high, by information bits "0000", "0001", "0010", "0011", . . . , "1111".

HII is used to indicate on which resource granularities the interfered cell may schedule cell edge users, for adjacent cells may be interfered on these resource granularities. In HII, the units are also resource granularities, and 1 bit is used for each resource granularity to indicate whether strong interference may occur on this resource granularity.

A processor 1103, which is used to perform interference coordination according to the uplink-downlink configuration of the interfering cell and the interference indication information received by the receiving unit.

As an illustration, the processor 1103 may, according to the uplink-downlink configuration of the interfered cell and the uplink-downlink configuration of the interfering cell, determine subframes in the interfering cell causing uplink-downlink interference on the interfered cell and subframes causing uplink-uplink and downlink-downlink interference; according to the interference indication information received by the receiving unit, adjust the transmitted power of the subframes causing uplink-downlink interference, uplink-uplink interference, and downlink-downlink interference on the interfered cell, or adjusts resource locations used by UEs served by the interfering cell, so as to reduce or avoid interference caused on the interfered cell.

As an illustration, the processing unit 1003 adjusts the transmitted power for the BS or the UE respectively depending on requirements in different interference directions.

For example, when the interference indication information is information indicating the interference impact on the interfered cell of the interfering cell and the interference indication information at a resource granularity or several resource granularities is "10", representing a "strong" interference impact on the interfered cell's signal produced by the interfering cell's signal at that resource granularity or several resource granularities, the interfering cell may reduce the transmitted power of the BS of the interfering cell (for downlink-to-uplink and uplink-to-uplink interference) or UE (for uplink-to-downlink and downlink-to-downlink interference) at a corresponding resource granularity position, or schedule the downlink channel or the uplink channel to another resource granularity that does not generate a strong interference impact for transmission.

As an illustration, when the interference indication information received by the receiver 1102 is an interference indication containing RNTP and HII, the processor 1103 schedules edge users in the interfering cell to resource granularities having lower interference strength levels in RNTP and HII to prevent strong interference caused on the interfered cell.

According to the BS provided in the embodiment of this invention, sends uplink-downlink configuration to the interfered cell so that the interfered cell may distinguish uplink-downlink interference based on the uplink-downlink configuration of the interfering cell and generate the uplink-downlink interference indication information, so that the BS may perform interference coordination based on the uplink-downlink interference indication information. The problem in the prior art of merely capable of handling uplink-uplink interference and downlink-downlink interference, unable to distinguish uplink-downlink interference, and unable to perform interference coordination for uplink-downlink interference can be solved.

A TDD system is provided in an embodiment of this invention, comprising: a first BS used in an interfered cell and a second BS used in an interfering cell, wherein, the first BS is used to receive a uplink-downlink configuration of an interfering cell sent from the interfering cell; generate interference indication information for subframes in the interfered cell in a direction opposite to the signal transmission direction in the interfering cell, according to a uplink-downlink configuration of the interfered cell and the uplink-downlink configuration of the interfering cell received by the receiver; send the uplink-downlink configuration of the interfered cell and the interference indication information generated by the processor to the interfering cell.

the second BS is used to send a uplink-downlink configuration of the interfering cell to an interfered cell; receive the uplink-downlink configuration of the interfered cell sent from the interfered cell, and interference indication information for subframes in the interfered cell in a direction opposite to the signal transmission direction in the interfering cell that is generated by the interfered cell according to the uplink-downlink configuration of the interfered cell and a uplink-downlink configuration of the interfering cell; perform interference coordination according to the uplink-downlink configuration of the interfered cell and the interference indication information.

According to the system provided in the embodiment of this invention, the interfered cell may distinguish uplink-downlink interference based on the uplink-downlink configuration of the interfering cell, and send the uplink-downlink interference indication information to the interfering cell, so that interference coordination can be performed on uplink-downlink interference by the interfering cell. The problem in the prior art of merely capable of handling uplink-uplink interference and downlink-downlink interference, unable to distinguish uplink-downlink interference, and unable to perform interference coordination for uplink-downlink interference can be solved.

Those skilled in the art may understand: some or all steps of the method of the above described embodiment can be realized with programs and instruction related hardware, the programs can be stored in a computer readable storage medium, such as, ROM, RAM, a magnetic disk, an optical disc, or various mediums capable of storing program codes, which when executed include steps of the method of the embodiment.

Description above is merely particular implementations of this invention, and the scope of this invention is not limited thereto. Any those skilled in the art can easily conceive modifications or alternations within the technical scope disclosed in this invention, which should be covered in the scope of this invention. Thus, the scope of this invention should coincide with the scope of accompanying claims.

What is claimed is:

1. An interference coordination method for a time division duplexing (TDD) system, comprising:
   receiving, by a base station of an interfered cell, information about an uplink-downlink configuration of an interfering cell from a base station of the interfering cell;
   generating, by the base station of the interfered cell, interference indication information for indicating subframes in the interfered cell which have an opposite transmission direction from subframes to be transmitted in a same time slot in the interfering cell according to an uplink-downlink configuration of the interfered cell and the uplink-downlink configuration of the interfering cell; and
   sending, by the base station of the interfered cell information about the uplink-downlink configuration of the interfered cell and the interference indication information to the base station of the interfering cell, to enable the base station of the interfering cell to perform interference coordination according to the uplink-downlink configuration of the interfered cell and the interference indication information.

2. The method according to claim 1, wherein generating the interference indication information further comprises:
   matching signal transmission directions of corresponding subframes in the interfered cell and the interfering cell by the base station of the interfered cell according to the uplink-downlink configuration of the interfered cell and the uplink-downlink configuration of the interfering cell;
   determining, by the base station of the interfered cell, subframes in the interfered cell which have an opposite transmission direction from subframes to be transmitted in a same time slot in the interfering cell according to the matching result.

3. The method according to claim 2, further comprising:
   obtaining, by the base station of the interfered cell, an interference measurement value of the subframes in the interfered cell which have an opposite transmission direction from subframes to be transmitted in a same time slot in the interfering cell;
   wherein generating the interference indication information is further according to the interference measurement value.

4. The method according to claim 3, wherein the interference indication information comprises information indicating interference strength level at each resource granularity or information indicating interference impact on the interfered cell by the interfering cell at each resource granularity.

5. The method according to claim 1, further comprising:
   setting an update period;
   wherein generating the interference indication information and sending the information about the uplink-downlink configuration of the interfered cell and the interference indication information are performed in each update period.

6. An interference coordination method for a time division duplexing (TDD) system, comprising:
   sending, by a base station of an interfering cell, information about an uplink-downlink configuration of the interfering cell to a base station of an interfered cell;
   receiving, by the base station of the interfering cell information about an uplink-downlink configuration of the interfered cell from the base station of the interfered cell, and interference indication information for indicating subframes in the interfered cell which have an opposite transmission direction from subframes to be transmitted in a same time slot in the interfering cell; and
   performing, by the base station of the interfering cell, interference coordination according to the uplink-downlink configuration of the interfered cell and the interference indication information.

7. The method according to claim 6, wherein the interference indication information comprises information indicating interference strength level at each resource granularity or information indicating interference impact on the interfered cell by the interfering cell at each resource granularity.

8. The method according to claim 6, wherein performing interference coordination comprises:
   determining, by the base station of the interfering cell, subframes of the interfering cell causing uplink-downlink interference on the interfered cell according to the uplink-downlink configuration of the interfered cell and the uplink-downlink configuration of the interfering cell; and
   according to the interference indication information, adjusting, by the base station of the interfering cell, transmitted power of the subframes causing uplink-downlink interference on the interfered cell, or adjusting resource locations used by user equipment served by the interfering cell, so as to reduce or avoid interference caused on the interfered cell.

9. The method according to claim 6, further comprising:
   setting an update period;
   wherein the sending, receiving and performing are performed in each update period.

10. A base station of an interfered cell, comprising:
    a receiver, configured to receive information about an uplink-downlink configuration of an interfering cell from a base station of the interfering cell;
    a processor, configured to generate interference indication information for indicating subframes in the interfered cell which have an opposite transmission direction from subframes to be transmitted in a same time slot in the interfering cell, according to an uplink-downlink configuration of the interfered cell and the uplink-downlink configuration of the interfering cell; and
    a transmitter, configured to send information about the uplink-downlink configuration of the interfered cell and the interference indication information to the base station of the interfering cell, to enable the base station of the interfering cell to perform interference coordination according to the uplink-downlink configuration of the interfered cell and the interference indication information.

11. The base station according to claim 10, wherein the processor is further configured to:
    according to the uplink-downlink configuration of the interfered cell and the uplink-downlink configuration of the interfering cell, match signal transmission directions of corresponding subframes in the interfered cell and the interfering cell;
    determine subframes in the interfered cell which have an opposite transmission direction from subframes to be transmitted in a same time slot in the interfering cell according to the matching result.

12. The base station according to claim 11, wherein the processor is further configured to:
obtain an interference measurement value of the subframes in the interfered cell which have an opposite transmission direction from subframes to be transmitted in a same time slot in the interfering cell;
wherein the processor is further configured to generate the interference indication information according to the interference measurement value.

13. The base station according to claim 12, wherein the interference indication information comprises information indicating interference strength level at each resource granularity or information indicating interference impact on the interfered cell by the interfering cell at each resource granularity.

14. The base station according to claim 10, wherein the processor is further configured to set an update period; and wherein the processor is further configured to perform the generating and to cause the transmitter to perform the sending in each update period.

15. A base station of an interfering cell, comprising:
a transmitter, configured to send information about an uplink-downlink configuration of the interfering cell to a base station of an interfered cell;
a receiver, configured to receive information about the uplink-downlink configuration of the interfered cell from the base station of the interfered cell, and interference indication information for indicating subframes in the interfered cell which have an opposite transmission direction from subframes to be transmitted in a same time slot in the interfering cell; and
a processor, configured to perform interference coordination according to the uplink-downlink configuration of the interfered cell and the interference indication information.

16. The base station according to claim 15, wherein the interference indication information comprises information indicating interference strength level at each resource granularity or information indicating interference impact on the interfered cell by the interfering cell at each resource granularity.

17. The base station according to claim 15, wherein the processor is further configured to:
according to an uplink-downlink configuration of the interfering cell and the uplink-downlink configuration of the interfered cell, determine subframes in the interfering cell causing uplink-downlink interference on the interfered cell; and
according to the interference indication information, adjust transmitted power of the subframes causing uplink-downlink interference on the interfered cell, or adjust resource locations used by the interfering cell, so as to reduce or avoid interference caused on the interfered cell.

18. The base station according to claim 17, wherein the processor is further configured to set an update period; and wherein the processor is further configured to perform the interference coordination in each update period.

* * * * *

UNITED STATES PATENT AND TRADEMARK OFFICE
CERTIFICATE OF CORRECTION

PATENT NO. : 9,622,251 B2
APPLICATION NO. : 14/573862
DATED : April 11, 2017
INVENTOR(S) : Li et al.

Page 1 of 1

It is certified that error appears in the above-identified patent and that said Letters Patent is hereby corrected as shown below:

On the Title Page

Column 1 (72) Inventors, city/country for inventor Li, "Guangdong (CN)" should read
-- Shenzhen (CN) --.

Column 1 (72) Inventors, city/country for inventor Ma, "Guangdong (CN)" should read
-- Shenzhen (CN) --.

Signed and Sealed this
Fifteenth Day of May, 2018

Andrei Iancu
*Director of the United States Patent and Trademark Office*